United States Patent
Barrowman et al.

(10) Patent No.: US 11,397,835 B2
(45) Date of Patent: Jul. 26, 2022

(54) DATA DEVICE INCLUDING OFN FUNCTIONALITY

(71) Applicant: VeriFone, inc., San Jose, CA (US)

(72) Inventors: John Henry Barrowman, Knoxville, TN (US); Doug Leigh Manchester, Rocklin, CA (US); William Martin Johansen, Jr., Rocklin, CA (US)

(73) Assignee: VERIFONE, INC., Wilmington, DE (US)

( * ) Notice: Subject to any disclaimer, the term of this patent is extended or adjusted under 35 U.S.C. 154(b) by 0 days.

(21) Appl. No.: 15/900,317

(22) Filed: Feb. 20, 2018

(65) Prior Publication Data
US 2018/0173903 A1 Jun. 21, 2018

Related U.S. Application Data

(63) Continuation of application No. 14/802,305, filed on Jul. 17, 2015, now abandoned.

(51) Int. Cl.
*G06F 1/16* (2006.01)
*G06F 3/0489* (2022.01)
(Continued)

(52) U.S. Cl.
CPC ............ *G06F 21/87* (2013.01); *G06F 1/1626* (2013.01); *G06F 1/1662* (2013.01); *G06F 3/0489* (2013.01); *G06F 21/86* (2013.01)

(58) Field of Classification Search
CPC ........ G06F 21/87; G06F 1/1662; G06F 21/86; G06F 1/1626; G06F 3/0489
See application file for complete search history.

(56) References Cited

U.S. PATENT DOCUMENTS

| 3,466,643 A | 9/1969 | Moorefield |
| 3,735,353 A | 5/1973 | Donovan et al. |

(Continued)

FOREIGN PATENT DOCUMENTS

| CN | 201984457 | 9/2011 |
| CN | 202306504 | 7/2012 |

(Continued)

OTHER PUBLICATIONS

An Office Action dated May 28, 2004, which issued during the prosecution of U.S. Appl. No. 10/326,726.
(Continued)

*Primary Examiner* — Amy Onyekaba
(74) *Attorney, Agent, or Firm* — Bond, Schoeneck & King, PLLC

(57) ABSTRACT

A data entry device including a housing, data entry circuitry located within the housing, a keypad mounted in the housing and having a plurality of movable key elements which, when depressed, are displaced to at least a predetermined extent from a first location within the housing to a second location within the housing and Optical Finger Navigation (OFN) circuitry mounted inside the housing, being operative for sensing at least some of the plurality of movable key elements when depressed and displaced to at least the predetermined extent from the first location within the housing to the second location within the housing and providing a key displacement output indicating key displacement to the data entry circuitry.

18 Claims, 17 Drawing Sheets

(51) Int. Cl.
*G06F 21/86* (2013.01)
*G06F 21/87* (2013.01)

(56) References Cited

U.S. PATENT DOCUMENTS

| | | | |
|---|---|---|---|
| 4,417,824 A | 11/1983 | Paterson et al. | |
| 4,486,637 A | 12/1984 | Chu | |
| 4,527,030 A | 7/1985 | Oelsch | |
| 4,593,384 A | 6/1986 | Kleijne | |
| 4,749,368 A | 6/1988 | Mouissie | |
| 4,807,284 A | 2/1989 | Kleijne | |
| 4,836,636 A | 6/1989 | Obara et al. | |
| 4,837,425 A * | 6/1989 | Edwards | E05B 49/006 235/382 |
| 4,847,595 A | 7/1989 | Okamoto | |
| 4,877,947 A | 10/1989 | Mori | |
| 5,086,292 A | 2/1992 | Johnson et al. | |
| 5,237,307 A | 8/1993 | Gritton | |
| 5,239,664 A | 8/1993 | Verrier et al. | |
| 5,321,143 A | 6/1994 | Sharpless et al. | |
| 5,353,350 A | 10/1994 | Unsworth et al. | |
| 5,506,566 A | 4/1996 | Oldfield et al. | |
| 5,561,282 A | 10/1996 | Price et al. | |
| 5,586,042 A | 12/1996 | Pisau et al. | |
| 5,675,319 A | 10/1997 | Rivenberg et al. | |
| 5,861,662 A | 1/1999 | Candelore | |
| 5,877,547 A | 3/1999 | Rhelimi | |
| 5,998,858 A | 12/1999 | Little et al. | |
| 6,272,562 B1 * | 8/2001 | Scott | G07C 9/37 710/16 |
| 6,288,640 B1 | 9/2001 | Gagnon | |
| 6,359,338 B1 | 3/2002 | Takabayashi | |
| 6,396,400 B1 | 5/2002 | Epstein, III et al. | |
| 6,414,884 B1 | 7/2002 | DeFelice et al. | |
| 6,438,825 B1 | 8/2002 | Kuhn | |
| 6,463,263 B1 | 10/2002 | Fellner et al. | |
| 6,466,118 B1 | 10/2002 | Van Zeeland et al. | |
| 6,552,713 B1 * | 4/2003 | Van Brocklin | G06F 3/03547 345/157 |
| 6,561,659 B1 * | 5/2003 | Hsu | H04M 1/22 362/23.06 |
| 6,563,488 B1 | 5/2003 | Rogers et al. | |
| 6,633,241 B2 | 10/2003 | Kaikuranta et al. | |
| 6,646,565 B1 | 11/2003 | Fu et al. | |
| 6,830,182 B2 | 12/2004 | Izuyama | |
| 6,853,093 B2 | 2/2005 | Cohen et al. | |
| 6,874,092 B1 | 3/2005 | Motoyama et al. | |
| 6,912,280 B2 | 6/2005 | Henry | |
| 6,917,299 B2 | 7/2005 | Fu et al. | |
| 6,921,988 B2 | 7/2005 | Moree | |
| 6,936,777 B1 | 8/2005 | Kawakubo | |
| 7,042,371 B2 | 5/2006 | Tervonen et al. | |
| 7,170,409 B2 | 1/2007 | Ehrensvard et al. | |
| 7,214,874 B2 * | 5/2007 | Dangler | H05K 5/0213 361/752 |
| 7,270,275 B1 * | 9/2007 | Moreland | H01H 13/702 200/61.93 |
| 7,283,066 B2 | 10/2007 | Shipman | |
| 7,309,012 B2 | 12/2007 | Von Mueller et al. | |
| 7,497,378 B2 | 3/2009 | Aviv | |
| 7,573,463 B2 * | 8/2009 | Liess | G06F 1/1616 345/170 |
| 7,671,324 B2 * | 3/2010 | Fleischman | G01R 31/31728 361/736 |
| 7,784,691 B2 | 8/2010 | Mirkazemi-Moud et al. | |
| 7,843,339 B2 | 11/2010 | Kirmayer | |
| 7,898,413 B2 | 3/2011 | Hsu et al. | |
| 8,212,161 B2 * | 7/2012 | Chou | H04M 1/23 345/170 |
| 8,577,042 B2 * | 11/2013 | Worthy | G06F 21/6245 380/278 |
| 8,847,923 B1 * | 9/2014 | Bowen | G06F 3/0202 345/175 |
| 9,013,336 B2 | 4/2015 | Schulz et al. | |
| 9,201,511 B1 * | 12/2015 | Spurlock | G06F 3/0317 |
| 9,394,723 B1 * | 7/2016 | Roth | E05B 27/006 |
| 9,605,167 B2 * | 3/2017 | Gazaway | C09D 11/037 |
| 9,751,668 B2 * | 9/2017 | Warden | B65C 1/04 |
| 10,218,383 B2 * | 2/2019 | McNicoll | G06F 21/83 |
| 2002/0002683 A1 | 1/2002 | Benson et al. | |
| 2003/0025617 A1 | 2/2003 | Kunigkeit et al. | |
| 2004/0031673 A1 * | 2/2004 | Levy | H01H 13/702 200/521 |
| 2004/0041792 A1 * | 3/2004 | Criscione | G06F 3/021 345/169 |
| 2004/0118670 A1 | 6/2004 | Park et al. | |
| 2004/0120101 A1 | 6/2004 | Cohen et al. | |
| 2005/0081049 A1 | 4/2005 | Nakayama et al. | |
| 2005/0184870 A1 | 8/2005 | Galperin et al. | |
| 2005/0275537 A1 * | 12/2005 | Kerr | G08B 13/126 340/568.2 |
| 2006/0049255 A1 | 3/2006 | Mueller et al. | |
| 2006/0049256 A1 | 3/2006 | Mueller et al. | |
| 2006/0109239 A1 * | 5/2006 | Hsiung | G06F 3/03543 345/156 |
| 2006/0109251 A1 * | 5/2006 | Kelly | G06F 3/038 345/168 |
| 2006/0139185 A1 * | 6/2006 | Bonnat | G06F 3/0421 341/21 |
| 2006/0192653 A1 | 8/2006 | Atkinson et al. | |
| 2006/0201701 A1 | 9/2006 | Coleman et al. | |
| 2006/0208089 A1 * | 9/2006 | Sadler | G06K 19/083 235/487 |
| 2007/0040674 A1 * | 2/2007 | Hsu | G06F 21/83 340/539.31 |
| 2007/0109152 A1 * | 5/2007 | Wald | H03K 17/969 341/22 |
| 2007/0152042 A1 | 7/2007 | Mittler | |
| 2007/0152839 A1 * | 7/2007 | Dalzell | G06F 11/3058 340/686.1 |
| 2007/0204173 A1 | 8/2007 | Kuhn | |
| 2008/0073491 A1 * | 3/2008 | Fleischman | H05K 1/0275 250/214 DC |
| 2008/0135617 A1 | 6/2008 | Aviv | |
| 2008/0180245 A1 | 7/2008 | Hsu et al. | |
| 2008/0218849 A1 * | 9/2008 | Uhl | G02B 21/0044 359/368 |
| 2008/0278353 A1 | 11/2008 | Smith et al. | |
| 2008/0308619 A1 * | 12/2008 | Adam | B65D 5/0254 229/222 |
| 2009/0058628 A1 | 3/2009 | Kirmayer | |
| 2009/0179869 A1 * | 7/2009 | Slotznick | G06F 3/0202 345/173 |
| 2009/0184850 A1 * | 7/2009 | Schulz | G06F 3/023 341/22 |
| 2010/0058077 A1 * | 3/2010 | Matsuda | G06F 21/86 726/26 |
| 2010/0258419 A1 * | 10/2010 | Chung | G02B 6/0035 362/627 |
| 2010/0271839 A1 * | 10/2010 | Chan | H01H 13/83 362/602 |
| 2010/0287624 A1 * | 11/2010 | Lindqvist | G06F 21/86 726/34 |
| 2011/0063109 A1 | 3/2011 | Ostermoller | |
| 2011/0100788 A1 * | 5/2011 | Eck | G06F 21/83 200/61.93 |
| 2011/0215938 A1 * | 9/2011 | Neo | G08B 13/22 200/61.93 |
| 2011/0248860 A1 * | 10/2011 | Avital | H05K 1/0275 340/652 |
| 2011/0279279 A1 * | 11/2011 | Mirkazemi-Moud | G06F 3/0219 340/635 |
| 2011/0316805 A1 * | 12/2011 | Yamada | G06F 3/038 345/173 |
| 2012/0018288 A1 * | 1/2012 | Rollet | G06F 21/83 200/512 |
| 2012/0020045 A1 * | 1/2012 | Tanase | H04M 1/18 200/600 |
| 2012/0047374 A1 * | 2/2012 | Klum | H05K 1/0275 713/192 |

(56) References Cited

U.S. PATENT DOCUMENTS

| | | | | |
|---|---|---|---|---|
| 2012/0056813 | A1* | 3/2012 | Shih | G06F 3/038 345/166 |
| 2012/0068846 | A1* | 3/2012 | Dalzell | G08B 13/08 49/506 |
| 2013/0072771 | A1* | 3/2013 | Gu | G06F 3/0425 600/479 |
| 2013/0099009 | A1* | 4/2013 | Filson | G05B 15/02 236/1 C |
| 2013/0127722 | A1* | 5/2013 | Gu | G06F 3/03547 345/166 |
| 2013/0240739 | A1* | 9/2013 | Shpater | G02B 3/0043 250/353 |
| 2013/0283386 | A1* | 10/2013 | Lee | G06F 21/86 726/26 |
| 2013/0342313 | A1* | 12/2013 | Conlin | G07C 9/23 235/382 |
| 2014/0132516 | A1* | 5/2014 | Tsai | G06F 3/0325 345/168 |
| 2014/0240234 | A1* | 8/2014 | Bylander | G06F 3/04895 345/156 |
| 2014/0306894 | A1* | 10/2014 | Lee | G06F 3/03543 345/166 |
| 2015/0061901 | A1* | 3/2015 | Casparian | H01H 13/705 341/22 |
| 2015/0077256 | A1* | 3/2015 | Maddox | G06Q 10/08 340/572.1 |
| 2015/0185864 | A1* | 7/2015 | Schulz | G06F 21/83 341/22 |
| 2015/0314927 | A1* | 11/2015 | Warden | B65C 1/04 250/461.1 |
| 2016/0066391 | A1* | 3/2016 | Delnoij | H05B 31/50 315/130 |
| 2017/0063450 | A1* | 3/2017 | Paulussen | H04B 10/0793 |
| 2018/0059025 | A1* | 3/2018 | Jiang | G01N 21/658 |

FOREIGN PATENT DOCUMENTS

| | | |
|---|---|---|
| DE | 22 41 738 | 3/1973 |
| DE | 60 101 096 | 7/2004 |
| EP | 0375545 A1 | 6/1990 |
| EP | 0375545 B1 | 2/1995 |
| EP | 1421549 | 5/2004 |
| EP | 1432031 | 6/2004 |
| EP | 1676182 | 7/2006 |
| GB | 892198 | 3/1962 |
| GB | 1 369 739 | 10/1974 |
| GB | 2 178 235 | 2/1987 |
| GB | 2 353 401 | 2/2001 |
| GB | 2 372 363 | 8/2002 |
| GB | 2 411 756 | 9/2005 |
| JP | 10293915 | 11/1998 |
| JP | 2002-108711 | 4/2002 |
| WO | 01/63994 | 8/2001 |
| WO | 2005/086546 | 9/2005 |
| WO | 2010/082190 | 7/2010 |

OTHER PUBLICATIONS

An International Search Report and a Written Opinion both dated Apr. 30, 2012, which issued during the prosecution of Applicant's PCT/US2012/020142.
Kremin, et al., "Capacitance sensing—waterproof capacitance sensing", Cypress Perform, Dec. 2006.
An Office Action dated Jul. 11, 2014, which issued during the prosecution of U.S. Appl. No. 12/355,857.
Van Ess, Dave; "Capacitive touch switches for automotive applications", http://www.automotivedesignline.com/, Feb. 2006.
An Office Action dated Apr. 10, 2012, which issued during the prosecution of U.S. Appl. No. 12/758,150.
An Office Action dated May 13, 2010, which issued during the prosecution of Applicant's U.S. Appl. No. 11/845,435.
A Notice of Allowance dated Sep. 10, 2010, which issued during the prosecution of Applicant's U.S. Appl. No. 11/845,435.
A Notice of Allowance dated Oct. 23, 2008, which issued during the prosecution of U.S. Appl. No. 11/636,369.
U.S. Appl. No. 61/011,993, filed Jan. 22, 2008.
A Notice of Allowance dated Oct. 26, 2004, which issued during the prosecution of Applicant's U.S. Appl. No. 10/326,726.
An International Preliminary Report on Patentability dated Jul. 19, 2011, which issued during the prosecution of Applicant's PCT/IL2009/000724.
An Office Action dated Mar. 13, 2008 which issued during the prosecution of U.S. Appl. No. 11/636,369.
A Notice of Allowance dated Dec. 19, 2014, which issued during the prosecution of Applicant's U.S. Appl. No. 12/355,857.
Supplementary European Search Report dated Oct. 31, 2013 which issued during the prosecution of Applicant's European App No. 07869932.
An Office Action dated Oct. 16, 2012, which issued during the prosecution of U.S. Appl. No. 12/355,857.
An Office Action dated May 11, 2012, which issued during the prosecution of U.S. Appl. No. 12/355,857.
U.S. Appl. No. 62/027,890, filed Jul. 23, 2014.

* cited by examiner

DATA DEVICE INCLUDING OFN FUNCTIONALITY

REFERENCE TO RELATED APPLICATIONS

This application is a continuation of U.S. patent application Ser. No. 14/802,305, filed Jul. 17, 2015, which claims the benefit of U.S. Provisional Patent Application Ser. No. 62/027,890, filed Jul. 23, 2014 and entitled "SENSITIVE DATA DEVICE", the disclosures of which are hereby incorporated by reference in their entireties.

FIELD OF THE INVENTION

The present invention relates generally to data devices.

BACKGROUND OF THE INVENTION

Various types of data devices are known.

SUMMARY OF THE INVENTION

The present invention seeks to provide an improved data entry device.

There is thus provided in accordance with a preferred embodiment of the present invention a data entry device including a housing, data entry circuitry located within the housing, a keypad mounted in the housing and having a plurality of movable key elements which, when depressed, are displaced to at least a predetermined extent from a first location within the housing to a second location within the housing and Optical Finger Navigation (OFN) circuitry mounted inside the housing, being operative for sensing at least some of the plurality of movable key elements when depressed and displaced to at least the predetermined extent from the first location within the housing to the second location within the housing and providing a key displacement output indicating key displacement to the data entry circuitry.

There is also provided in accordance with another preferred embodiment of the present invention a data entry device including a housing, data entry circuitry located within the housing, tamper detection circuitry located within the housing, a keypad mounted in the housing and having a plurality of movable key elements and OFN circuitry mounted inside the housing, being operative for sensing displacement of the plurality of movable key elements and tampering with the device and providing a key displacement output indicating key displacement to at least a predetermined extent to the data entry circuitry and a tamper indication output to the tamper detection circuitry.

There is further provided in accordance with yet another preferred embodiment of the present invention a sensitive data device including a housing, sensitive data handling circuitry located within the housing, tamper detection circuitry located within the housing and OFN circuitry mounted inside the housing, being operative for sensing tampering with the device and providing a tamper indication output to the tamper detection circuitry.

Preferably, the OFN circuitry is mounted on an electrical circuit board spaced from the movable key elements. Additionally, the device also includes a spacer mounted between the electrical circuit board and the keypad.

Preferably, the electrical circuit board is arranged such that displacement of a key from a first location within the housing to a second location within the housing by the finger of a user is detected and identified by the OFN circuitry.

In accordance with a preferred embodiment of the present invention the OFN circuitry is incorporated within an OFN module which includes an illuminator and optics. Additionally, the OFN module is generally centered with respect to the plurality of movable key elements and lies therebelow so as to be in a line of sight with all of the plurality of movable key elements. Preferably, the OFN module is also in a line of sight with other regions within the housing.

In accordance with a preferred embodiment of the present invention the OFN module views optically identifiable markings on the plurality of movable key elements as well as other objects which provide a background useful in detecting tampering. Additionally or alternatively, a background output of the OFN module is employed as a reference against which an output of said OFN module indicating possible tampering is compared. Preferably, at least one of the following events produces a tampering indication: creating a hole in the data entry device using a tool, the tool being seen by the OFN module and removal of the tool, allowing light to enter the housing, the light being seen by the OFN module.

Accordingly, even if tampering occurs in a darkened environment, such tampering will be detected.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1A:
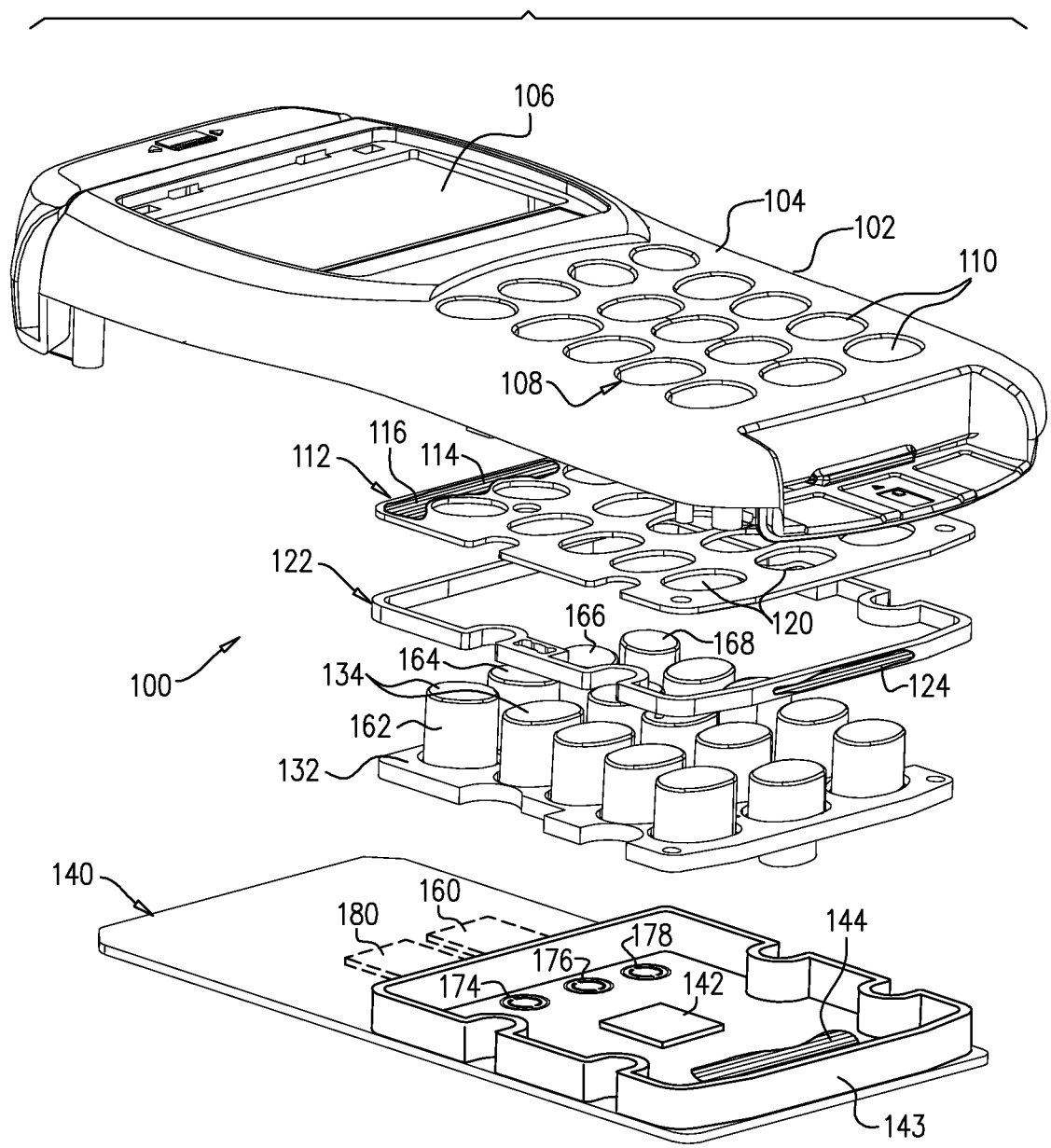
FIGS. 1A and 1B are simplified exploded view illustrations, taken in respective opposite directions, of a secure keypad device constructed and operative in accordance with a preferred embodiment of the present invention and including Optical Finger Navigation (OFN) circuitry operative for at least one of tamper detection and key displacement identification.
Figure 1B:
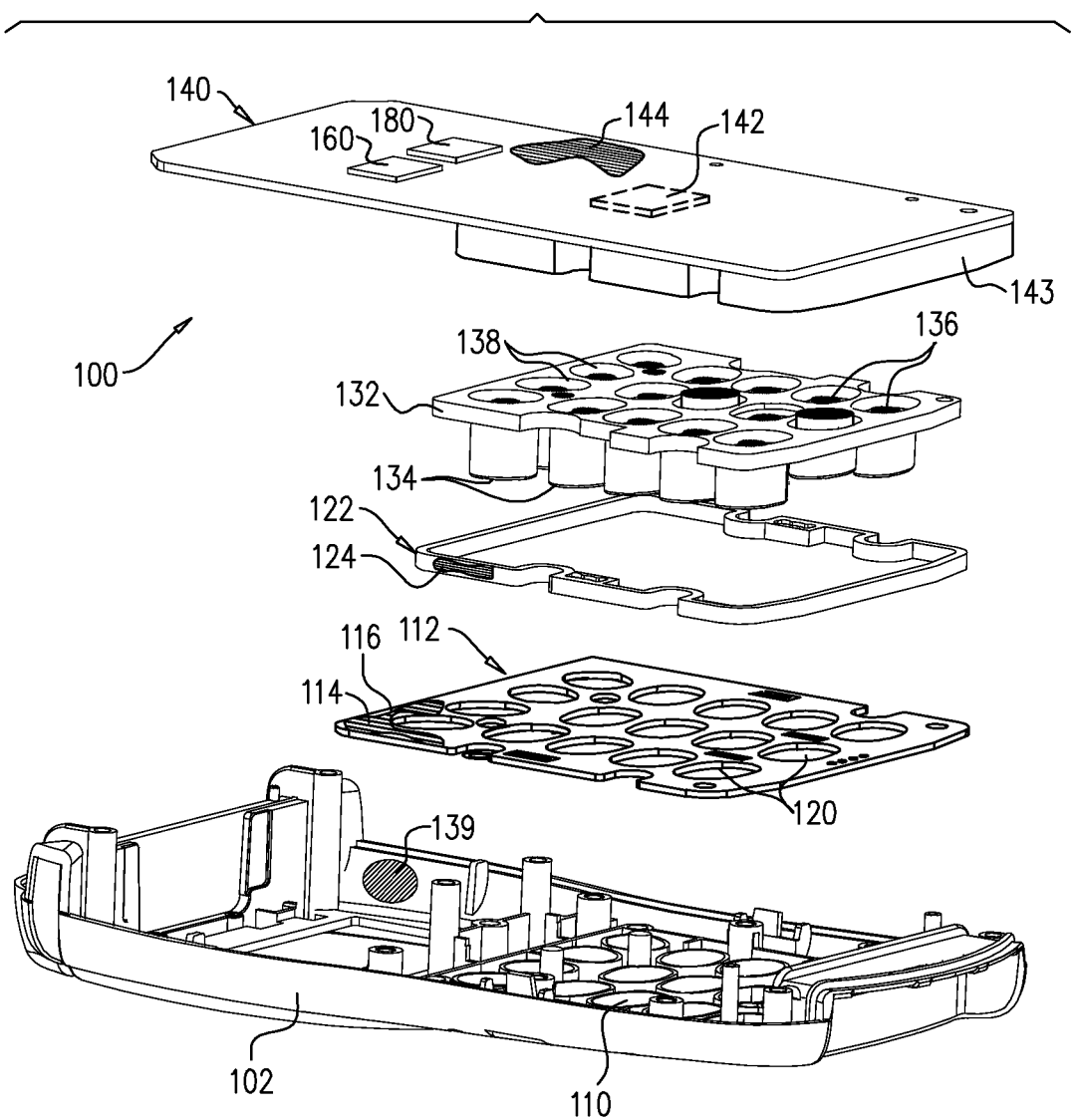

Reference is now made to FIGS. 1A and 1B, which partially illustrate a secure keypad device constructed and operative in accordance with a preferred embodiment of the present invention.

As seen in FIGS. 1A and 1B, there is provided a secure keypad device 100 including a top housing element 102 and a bottom housing element (not shown), which together define a keypad device housing. Housing element 102 includes, on a top surface 104 thereof, a display aperture 106, through which a display (not shown) may be viewed, and an array 108 of key apertures 110.

An optional anti-tamper circuit board 112, which preferably includes an anti-tampering grid 114 formed of a multiplicity of interconnected anti-tampering electrical conductors 116, underlies top surface 104 and is provided with key apertures 120 in registration with key apertures 110. Fixedly and electrically coupled to anti-tamper circuit board 112 is a peripheral anti-tamper keypad enclosure 122, which preferably includes an anti-tampering grid 124 formed of a multiplicity of interconnected anti-tampering electrical conductors.

A key mat 132, preferably formed of a resilient plastic or rubber, defines a plurality of depressible keys 134, preferably integrally formed with mat 132, which partially extend through key apertures 110 and 120 and preferably have readily optically identifiable markings 136 formed on corresponding bottom facing surfaces 138 thereof. Additional optically identifiable markings 139 may be provided on other interior surfaces, such as inner surfaces of the housing.

An electrical circuit board 140, which functions, inter alia, as a mounting board for an OFN module 142, is disposed in predetermined spaced relationship with key mat 132. OFN module 142 is preferably a Model ADBS-A350 commercially available from Pixart Imaging Inc., No. 5, Innovation Road 1, HsinChu Science Park, Hsin-Chu, Taiwan, R.O.C. The arrangement of key mat 132 and of electrical circuit board 140 is such that depression of a key 134 by the finger of a user is detected and identified by OFN module 142. It is noted that the OFN module 142 is operative to sense changes in the level of light received by it from various locations within its field of view.

In the illustrated embodiment of FIGS. 1A-2E, the OFN module 142 is generally centered with respect to the plurality of depressible keys 134 and lies therebelow so as to be in a line of sight with readily optically identifiable markings 136 formed on corresponding bottom facing surfaces 138 of all of depressible keys 134 and preferably also in a line of sight with other regions within the housing and more particularly with features and/or markings, such as optically identifiable markings 139 which can be sensed by the OFN module 142.

A spacer 143, preferably formed of a transparent material or defining open side walls, is provided between electrical circuit board 140 and key mat 132 in order to enhance the ability of the OFN module 142 to view not only all of the markings on all of the keys but also as much as possible of the interior of the housing and the markings and features thereof.

Circuit board 140 preferably includes an anti-tampering grid 144 formed of a multiplicity of interconnected anti-tampering electrical conductors.

It is appreciated that the anti tampering grids 144, 114 and 124 and enclosure 122 are preferably interconnected so as to define a keyboard anti-tampering enclosure, which is coupled to anti-tampering detection circuitry 160. Anti-tampering detection circuitry 160 is typically enclosed in an anti-tampering enclosure (not shown). Alternatively, anti-tampering detection circuitry 160 may itself be secure against tampering.

It is appreciated that the anti-tampering grids can be interconnected in numerous ways using various types of connectors.

In accordance with a preferred embodiment of the present invention, the OFN module 142 functions, inter alia, as a case-open switch which senses physical tampering with and opening of the housing. The output of the OFN module is preferably provided to anti-tampering detection circuitry 160 to enable the output of the OFN module to be used for detection of tampering. Upon detection of tampering one or both of the following actions may take place:

registration of a tampered condition and prevention of data entry, such as PIN entry.

It is appreciated that not all key displacements need be sensed by the OFN module. For example, the key displacements of one or more function keys, such as keys 162, 164, 166 and 168, may be sensed by engagement thereof with corresponding conventional electrical contacts, such as contacts 174, 176 and 178.

Preferably, the secure keypad device 100 includes a main microprocessor 180 which preferably includes, inter alia, encryption/decryption capabilities. Such a main microprocessor may beneficially be included in the secure keypad devices and data entry devices described hereinbelow with reference to FIGS. 5A-8B. It is appreciated that the functionality of anti-tampering detection circuitry 160 may be carried out by main microprocessor 180.

Figure 2A:
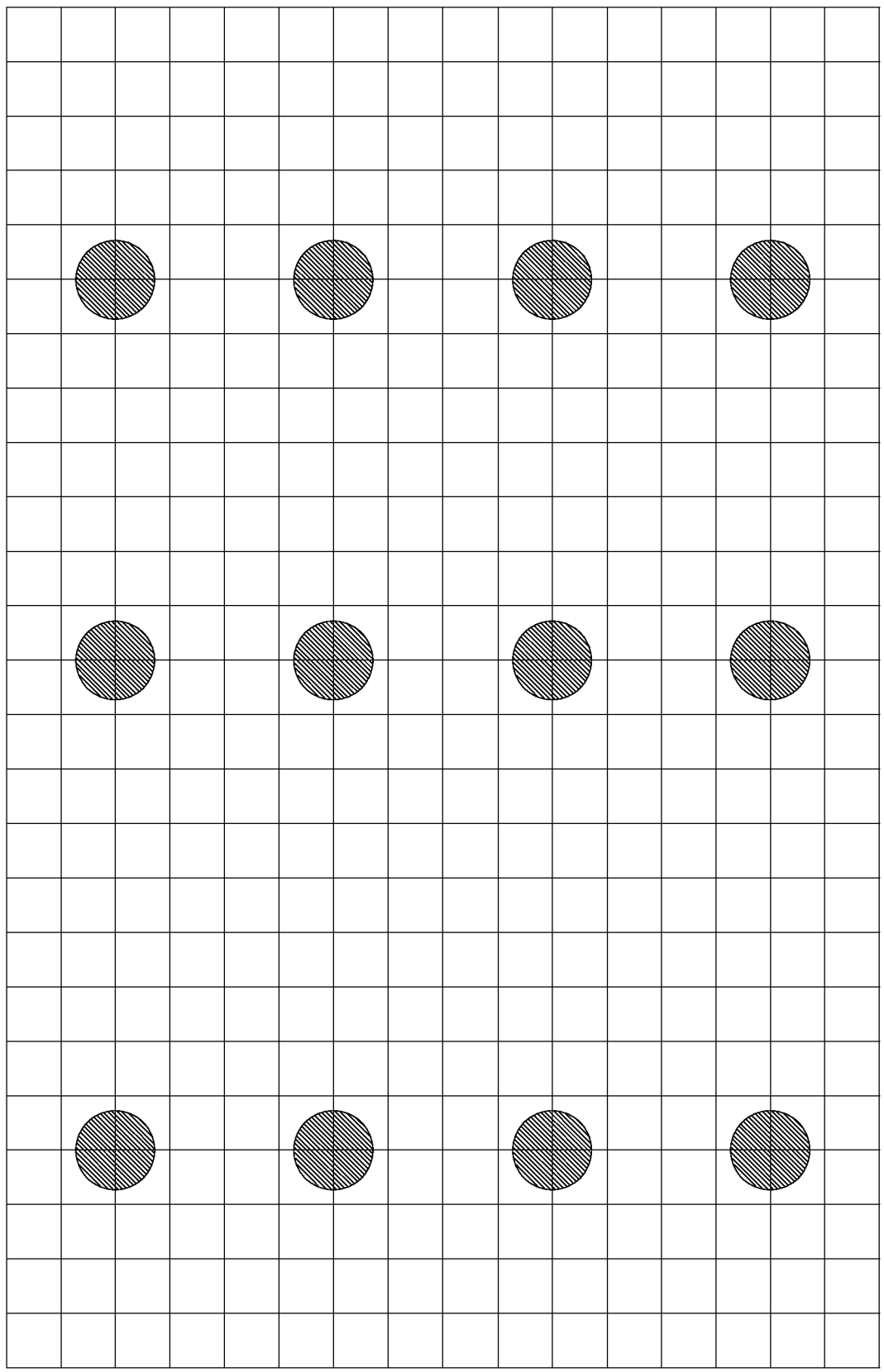
FIG. 2A is a simplified, not to scale, illustration of a steady state scene as viewed by OFN circuitry in the embodiment of FIGS. 1A & 1B in the absence of key displacement to at least a predetermined extent and tampering.

Reference is now made to FIG. 2A, which is a simplified, not to scale, illustration of an image captured by the OFN module 142, located generally below the 5 key, in the embodiment of FIGS. 1A & 1B, in the absence of key displacement beyond a predetermined extent and tampering. It is appreciated that the dark spots represent light reflected from readily optically identifiable markings 136 formed on corresponding bottom facing surfaces 138 of keys 134. FIG. 2A shows a state in which none of the keys is displaced. It is appreciated that angular optical distortions in the shape of the spots are generally not shown in FIGS. 2A-2E. The grid shown in FIGS. 2A-2E represents a pixel grid, with each block representing a single pixel or an X by Y array of pixels.

Figure 2B:
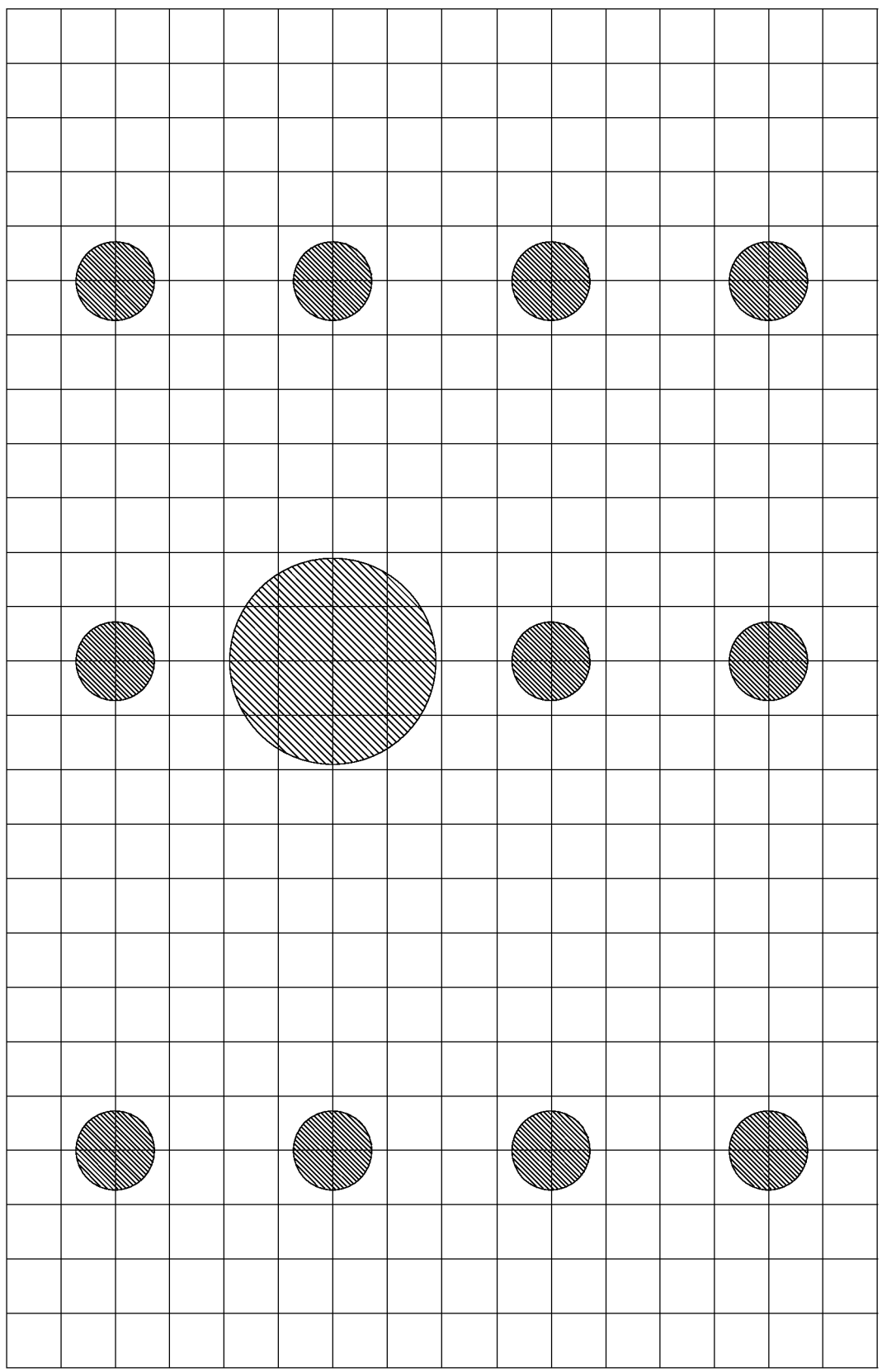
FIG. 2B is a simplified, not to scale, illustration of a scene as viewed by OFN circuitry upon depression of a number 5 key in the absence of tampering.

Reference is now made to FIG. 2B, which is a simplified illustration of a scene as viewed by the OFN module 142 upon displacement of a number 5 key from a first location within the housing to a second location within the housing in the absence of tampering. It is seen that the spot corresponding to the reflected light from marking 136 on the bottom facing surface of the number 5 key is enlarged. It is further appreciated that normally displacement of a key causes the intensity of the reflected light received by the OFN module 142 to increase.

Figure 2C:
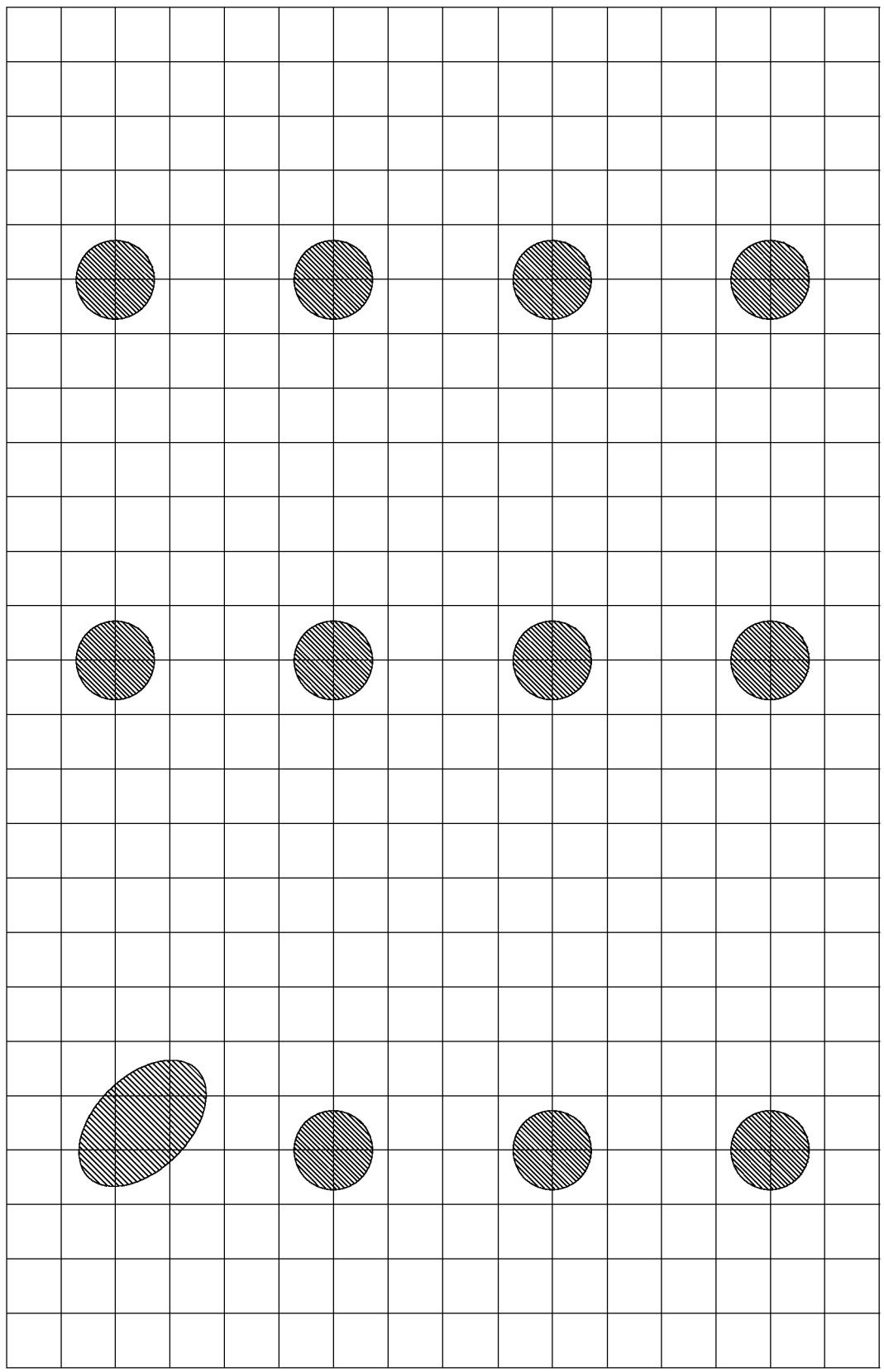
FIG. 2C is a simplified, not to scale, illustration of a scene as viewed by OFN circuitry upon depression of a number 1 key in the absence of tampering.

Reference is now made to FIG. 2C, which is a simplified illustration of a scene as viewed by OFN module 142 upon displacement of a number 1 key from a first location within the housing to a second location within the housing in the absence of tampering. It is seen that the spot corresponding to the reflected light from marking 136 on the bottom facing surface of the number 1 key is enlarged. Here a general approximation of the angular optical distortion in the shape of the enlarged spot corresponding to the displaced number 1 key is shown, not necessarily to scale.

Figure 2D:
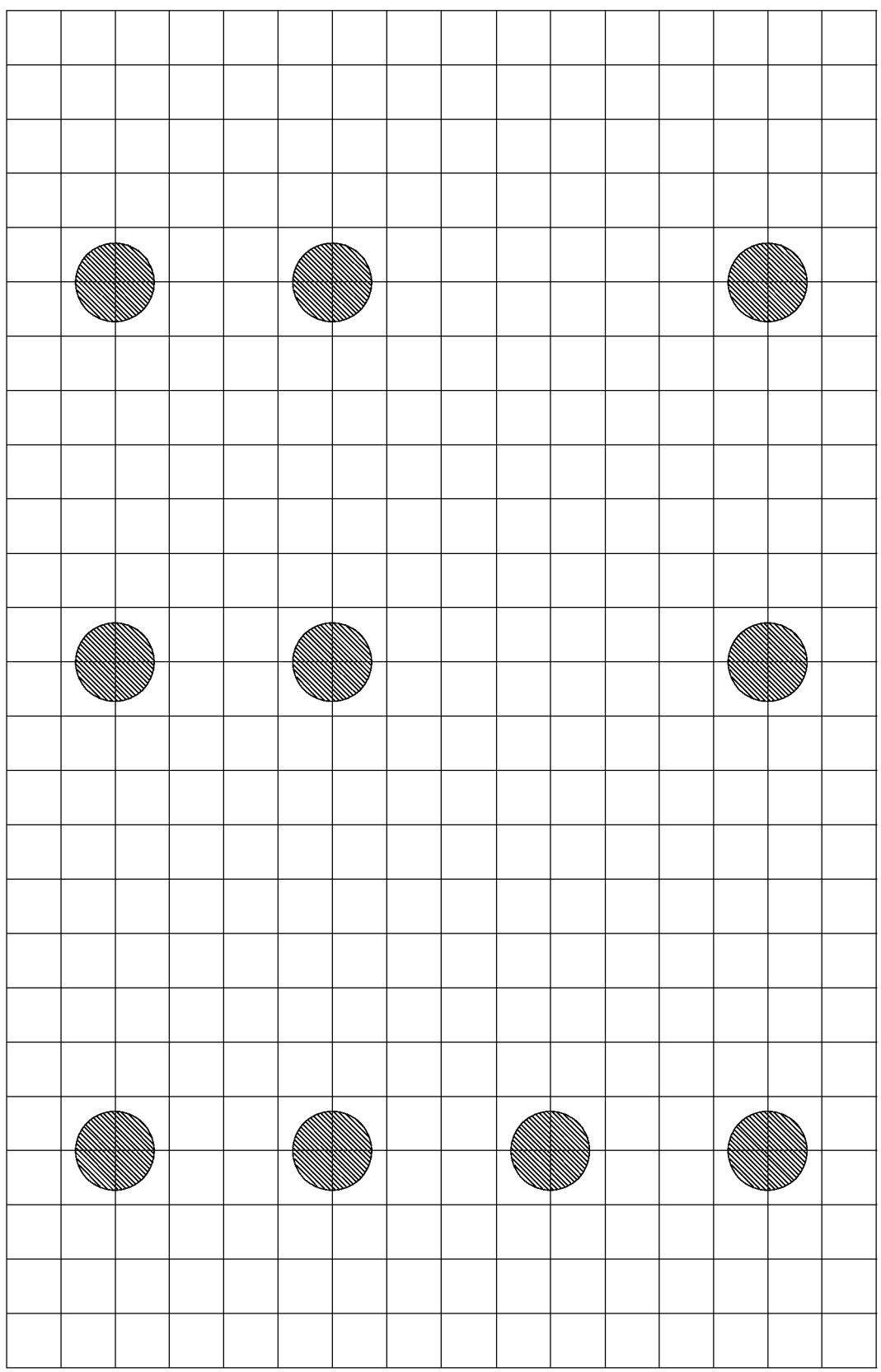
FIG. 2D is a simplified, not to scale, illustration of a scene as viewed by OFN circuitry upon tampering by inserting a non-reflecting probe into the housing.

Reference is now made to FIG. 2D, which is a simplified illustration of a scene as viewed by OFN module 142 upon tampering by inserting a non-reflecting probe into the housing. Here it is seen that the probe blocks the reflected light from the optically identifiable markings 136 on the bottom surfaces of number 8 and 9 keys.

Figure 2E:
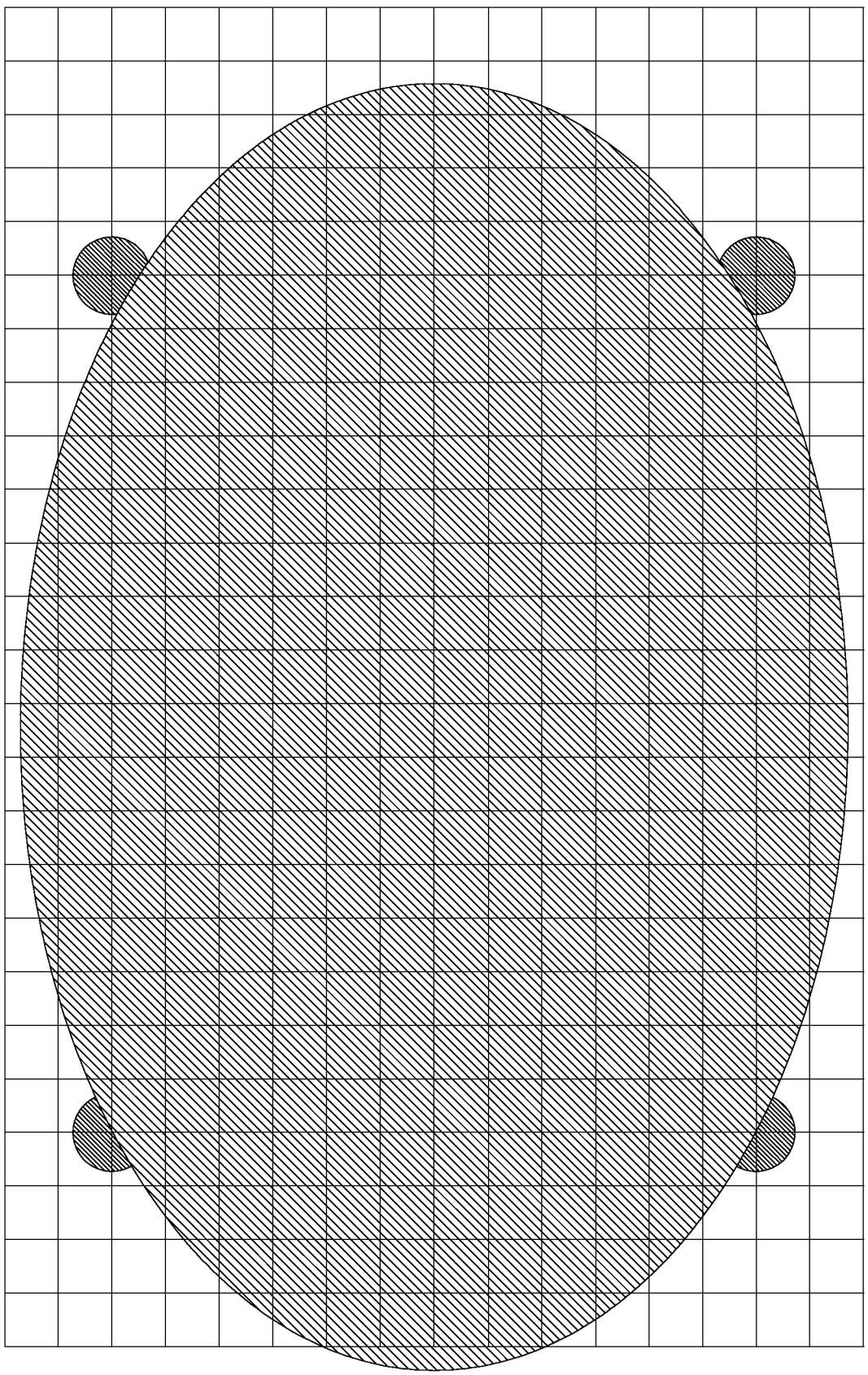
FIG. 2E is a simplified, not to scale, illustration of a scene as viewed by OFN circuitry upon tampering by removing a key.

Reference is now made to FIG. 2E, which is a simplified illustration of a scene as viewed by OFN module 142 upon tampering by removing a key. In this example, where ambient light is present, removal of a key, such as the number 5 key, allows a flood of light into the housing, such that the OFN module sees an image which may be similar to what is shown in FIG. 2E.

Figure 3A:
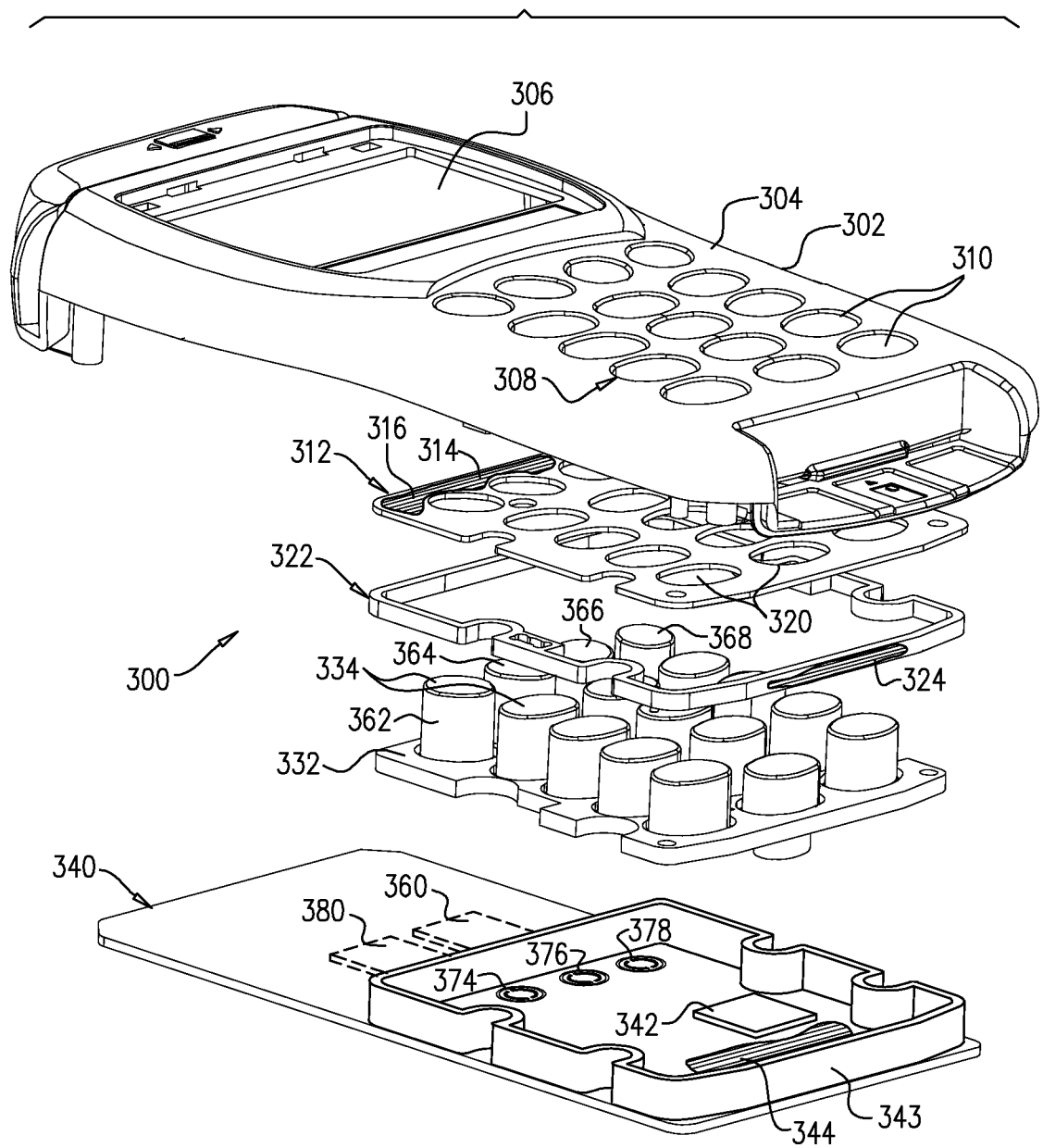
FIGS. 3A and 3B are simplified exploded view illustrations, taken in respective opposite directions, of a secure keypad device constructed and operative in accordance with another preferred embodiment of the present invention and including OFN circuitry operative for at least one of tamper detection and key displacement identification.
Figure 3B:
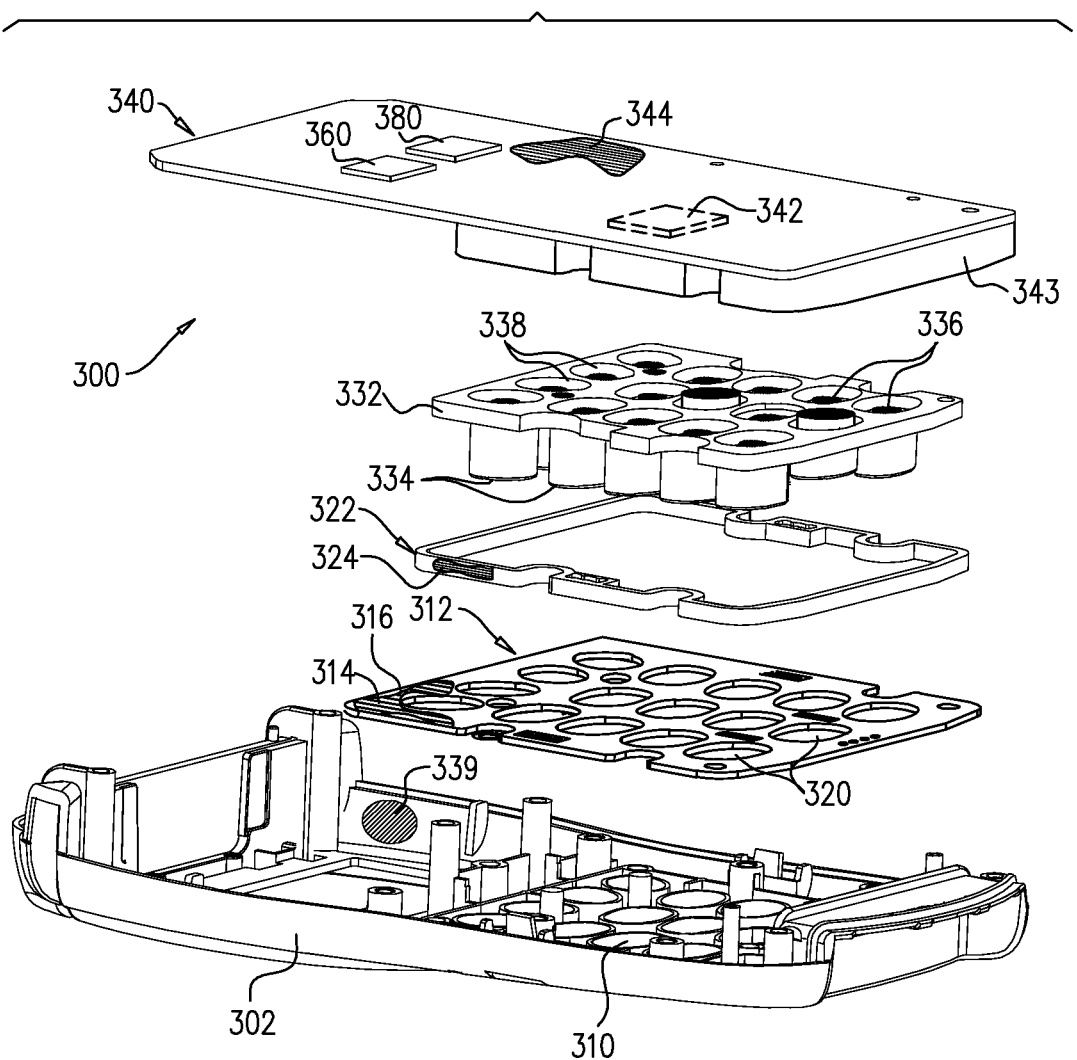

Reference is now made to FIGS. 3A and 3B, which partially illustrate a secure keypad device constructed and operative in accordance with another preferred embodiment of the present invention. In this embodiment, an OFN module is not centered below the number 5 key as in the embodiment of FIGS. 1A-2E, but rather is located at a side of the housing outwardly from all of the keys. Accordingly, FIGS. 4A-4E show, in a simplified, not to scale, manner, an overall angular distortion resulting from the non-centered position of the OFN module.

As seen in FIGS. 3A and 3B, there is provided a secure keypad device 300 including a top housing element 302 and a bottom housing element (not shown), which together define a keypad device housing. Housing element 302 includes, on a top surface 304 thereof, a display aperture 306, through which a display (not shown) may be viewed, and an array 308 of key apertures 310.

An anti-tamper circuit board 312, which preferably includes an anti-tampering grid 314 formed of a multiplicity of interconnected anti-tampering electrical conductors 316, underlies top surface 304 and is provided with key apertures 320 in registration with key apertures 310. Fixedly and electrically coupled to anti-tamper circuit board 312 is a peripheral anti-tamper keypad enclosure 322, which preferably includes an anti-tampering grid 324 formed of a multiplicity of interconnected anti-tampering electrical conductors.

A key mat 332, preferably formed of a resilient plastic or rubber, defines a plurality of depressible keys 334, preferably integrally formed with mat 332, which partially extend through key apertures 310 and 320 and preferably have readily optically identifiable markings 336 formed on corresponding bottom facing surfaces 338 thereof. Additional optically identifiable markings 339 may be provided on other interior surfaces, such as inner surfaces of the housing.

An electrical circuit board 340, which functions, inter alia, as a mounting board for an OFN module 342, is disposed in predetermined spaced relationship with key mat 332. OFN module 342 is preferably a Model ADBS-A350 commercially available from Pixart Imaging Inc., No. 5, Innovation Road 1, HsinChu Science Park, Hsin-Chu, Taiwan, R.O.C. The arrangement of key mat 332 and of electrical circuit board 340 is such that depression of a key 334 by the finger of a user is detected and identified by OFN module 342. In the illustrated embodiment of FIGS. 3A-4E, the OFN module 342 is generally not centered with respect to the plurality of depressible keys 334 but lies therebelow so as to be in a line of sight with all of depressible keys 334 and preferably also in a line of sight with other regions within the housing. A spacer 343, preferably formed of a transparent material or defining open side walls, is provided between electrical circuit board 340 and key mat 332 in order to enhance the ability of the OFN module to view not only all of the keys but also as much as possible of the interior of the housing.

Circuit board 340 preferably includes an anti-tampering grid 344 formed of a multiplicity of interconnected anti-tampering electrical conductors.

It is appreciated that the anti tampering grids 344, 314 and 324 and enclosure 322 are preferably interconnected so as to define a keyboard anti-tampering enclosure, which is coupled to anti-tampering detection circuitry 360. Anti-tampering detection circuitry 360 is typically enclosed in an anti-tampering enclosure (not shown). Alternatively, anti-tampering detection circuitry 360 may itself be secure against tampering.

It is appreciated that the anti-tampering grids can be interconnected in numerous ways using various types of connectors.

In accordance with a preferred embodiment of the present invention, the OFN module functions, inter alia, as a case-open switch which senses physical tampering and opening of the housing. The output of the OFN module is preferably provided to anti-tampering detection circuitry 360 to enable the output of the OFN module to be used for detection of tampering.

It is appreciated that not all key displacements need be sensed by the OFN module. For example, the key displacements of one or more function keys, such as keys 362, 364, 366 and 368, may be sensed by engagement thereof with corresponding conventional electrical contacts, such as contacts 374, 376 and 378.

Preferably, the secure keypad device 300 includes a main microprocessor 380 which preferably includes, inter alia, encryption/decryption capabilities. Such a main microprocessor may beneficially be included in the secure keypad devices and data entry devices described hereinbelow with reference to FIGS. 5A-8B. It is appreciated that the functionality of anti-tampering detection circuitry 360 may be carried out by main microprocessor 380.

Figure 4A:
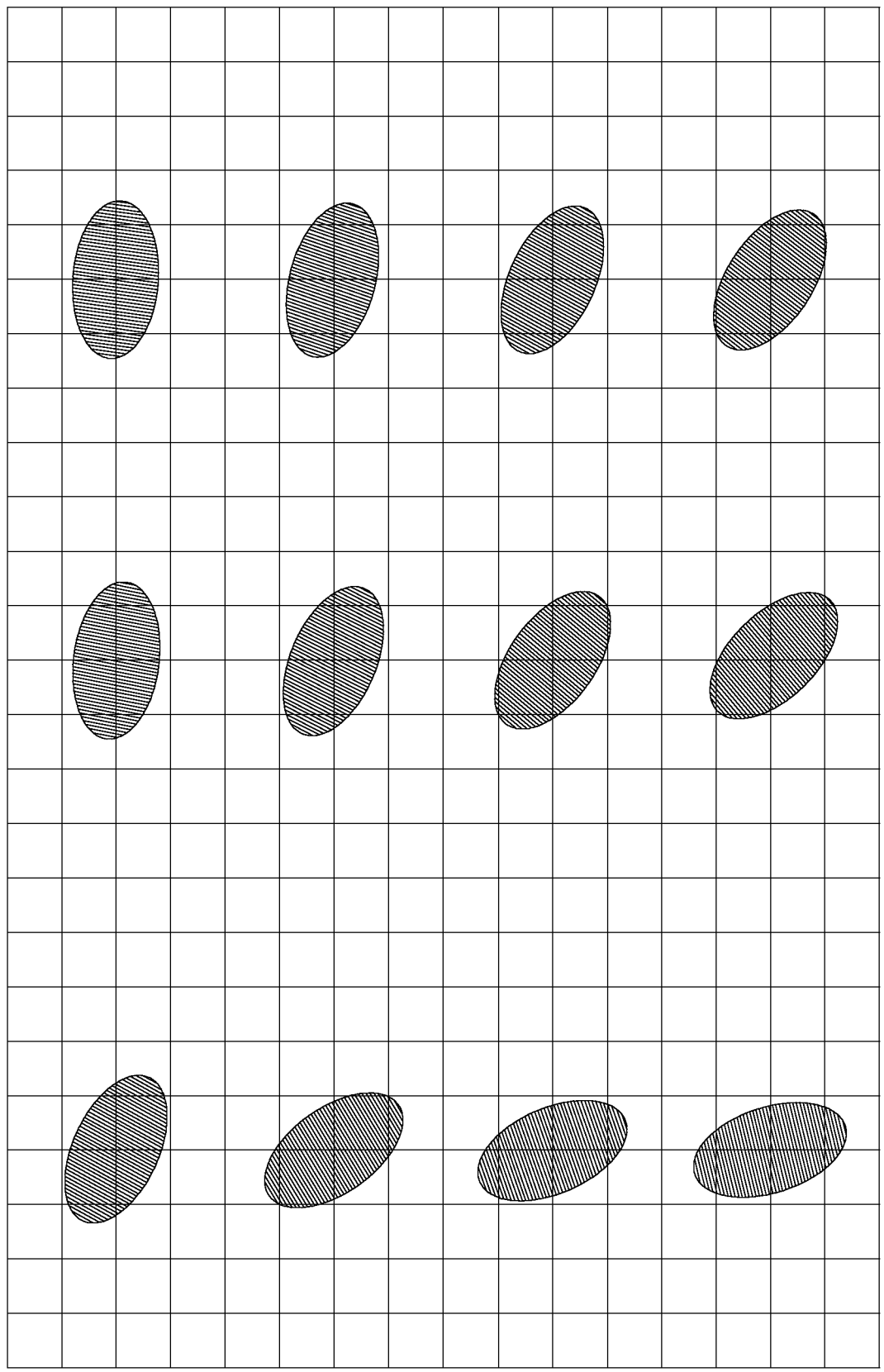
FIG. 4A is a simplified illustration of a steady state scene as viewed by OFN circuitry in the embodiment of FIGS. 3A & 3B in the absence of key displacement to at least a predetermined extent and tampering.

Reference is now made to FIG. 4A, which is a simplified, not to scale, illustration of an image captured by OFN module 342 in the embodiment of FIGS. 3A & 3B in the absence of key displacement beyond a predetermined extent and tampering. It is appreciated that the dark spots represent light reflected from readily optically identifiable markings 336 formed on corresponding bottom facing surfaces 338 of keys 334. FIG. 4A shows a state in which none of the keys is depressed. It is appreciated that angular optical distortions in the shape of the spots are generally not shown in FIGS. 4A-4E. The grid shown in FIGS. 4A-4E represents a pixel grid, with each block representing a single pixel or an X by Y array of pixels.

Figure 4B:
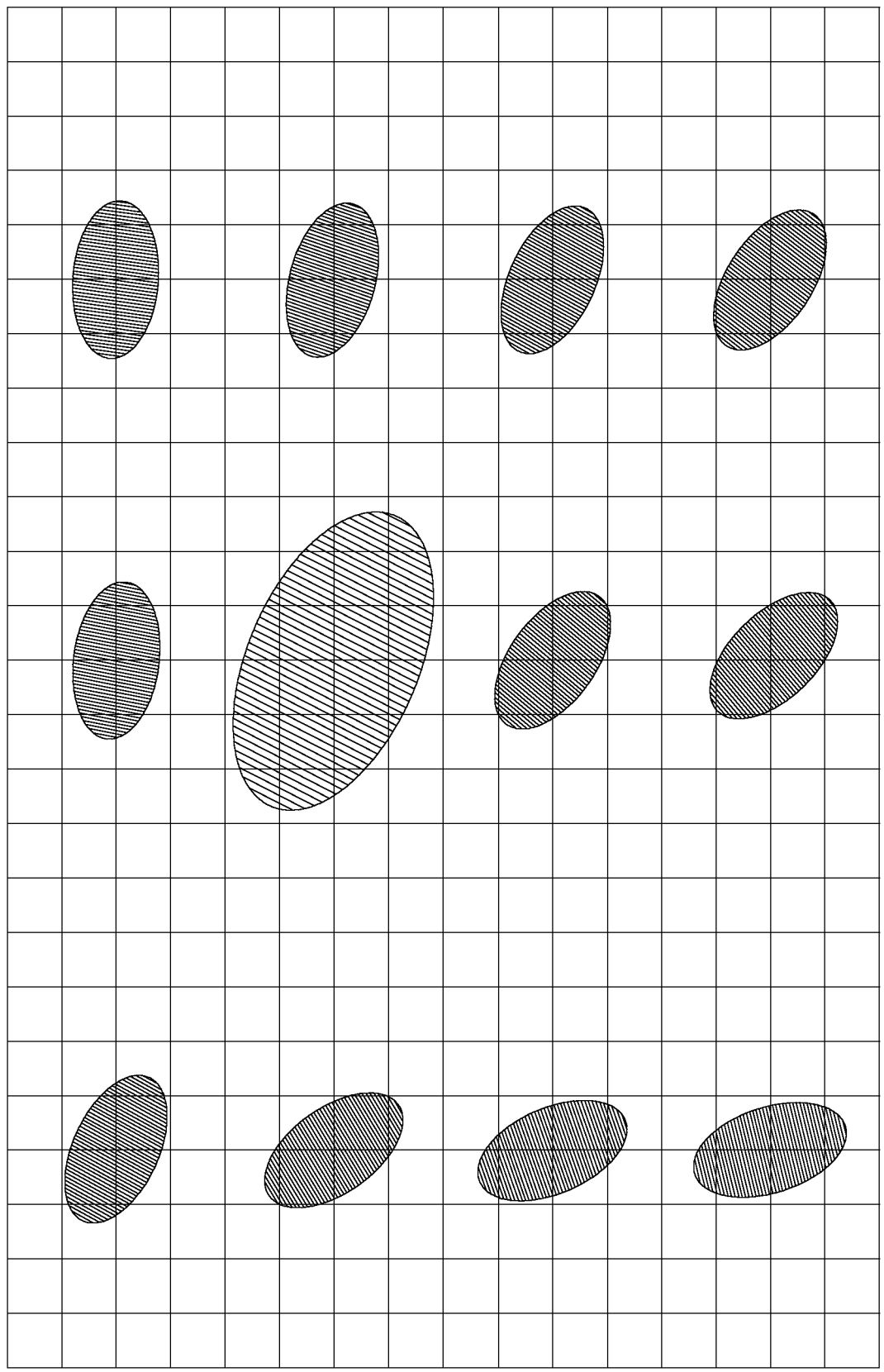
FIG. 4B is a simplified, not to scale, illustration of a scene as viewed by OFN circuitry in the embodiment of FIGS. 3A & 3B upon depression of a number 5 key in the absence of tampering.

Reference is now made to FIG. 4B, which is a simplified illustration of a scene as viewed by OFN module 342 upon depression of a number 5 key from a first location within the housing to a second location within the housing in the absence of tampering. It is seen that the spot corresponding to the reflected light from marking 336 on the bottom facing surface of the number 5 key is enlarged. It is further appreciated that normally depression of a key causes the intensity of the reflected light received by OFN module 342 to increase.

Figure 4C:
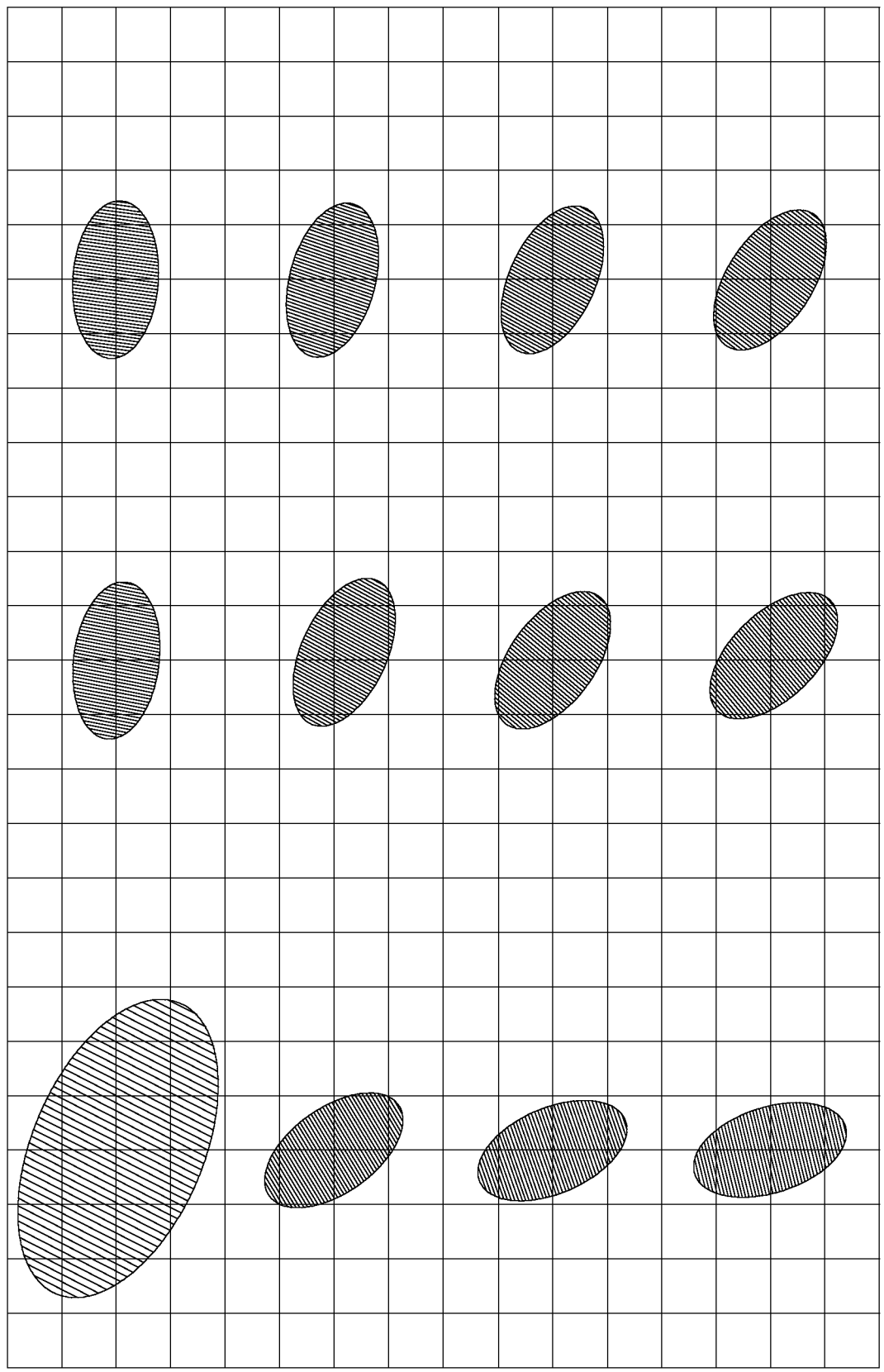
FIG. 4C is a simplified, not to scale, illustration of a scene as viewed by OFN circuitry in the embodiment of FIGS. 3A & 3B upon depression of a number 1 key in the absence of tampering.

Reference is now made to FIG. 4C, which is a simplified illustration of a scene as viewed by OFN module 342 upon depression of a number 1 key from a first location within the housing to a second location within the housing in the absence of tampering. It is seen that the spot corresponding to the reflected light from marking 336 on the bottom facing surface of the number 1 key is enlarged. Here a general approximation of the angular optical distortion in the shape of the enlarged spot corresponding to the depressed number 1 key is shown, not necessarily to scale.

Figure 4D:
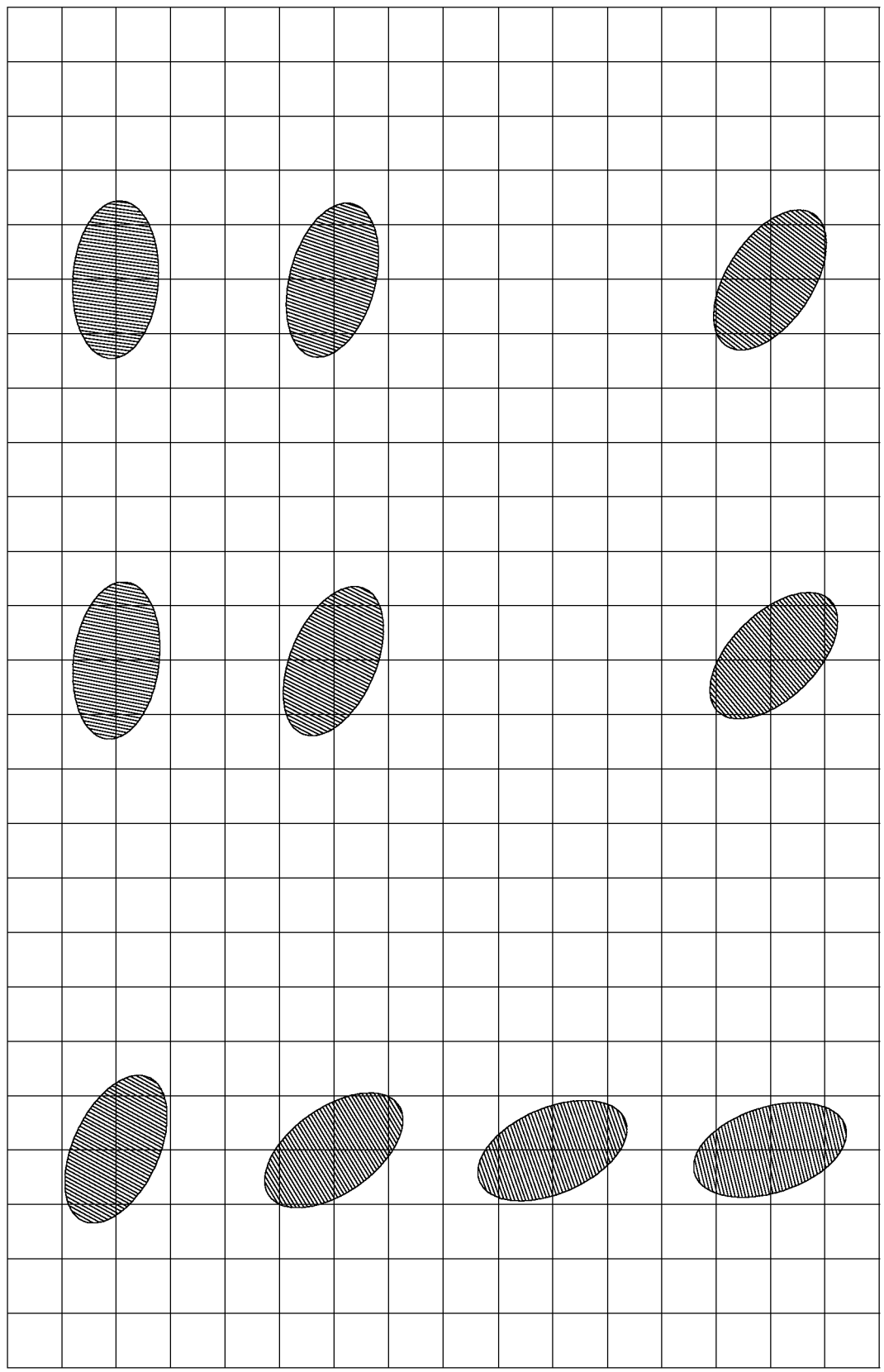
FIG. 4D is a simplified, not to scale, illustration of a scene as viewed by OFN circuitry in the embodiment of FIGS. 3A & 3B upon tampering by inserting a non-reflecting probe into the housing.

Reference is now made to FIG. 4D, which is a simplified illustration of a scene as viewed by OFN module 342 upon tampering by inserting a non-reflecting probe into the housing. Here it is seen that the probe blocks the reflected light from the optically identifiable markings 336 on the bottom surfaces of number 8 and 9 keys.

Figure 4E:
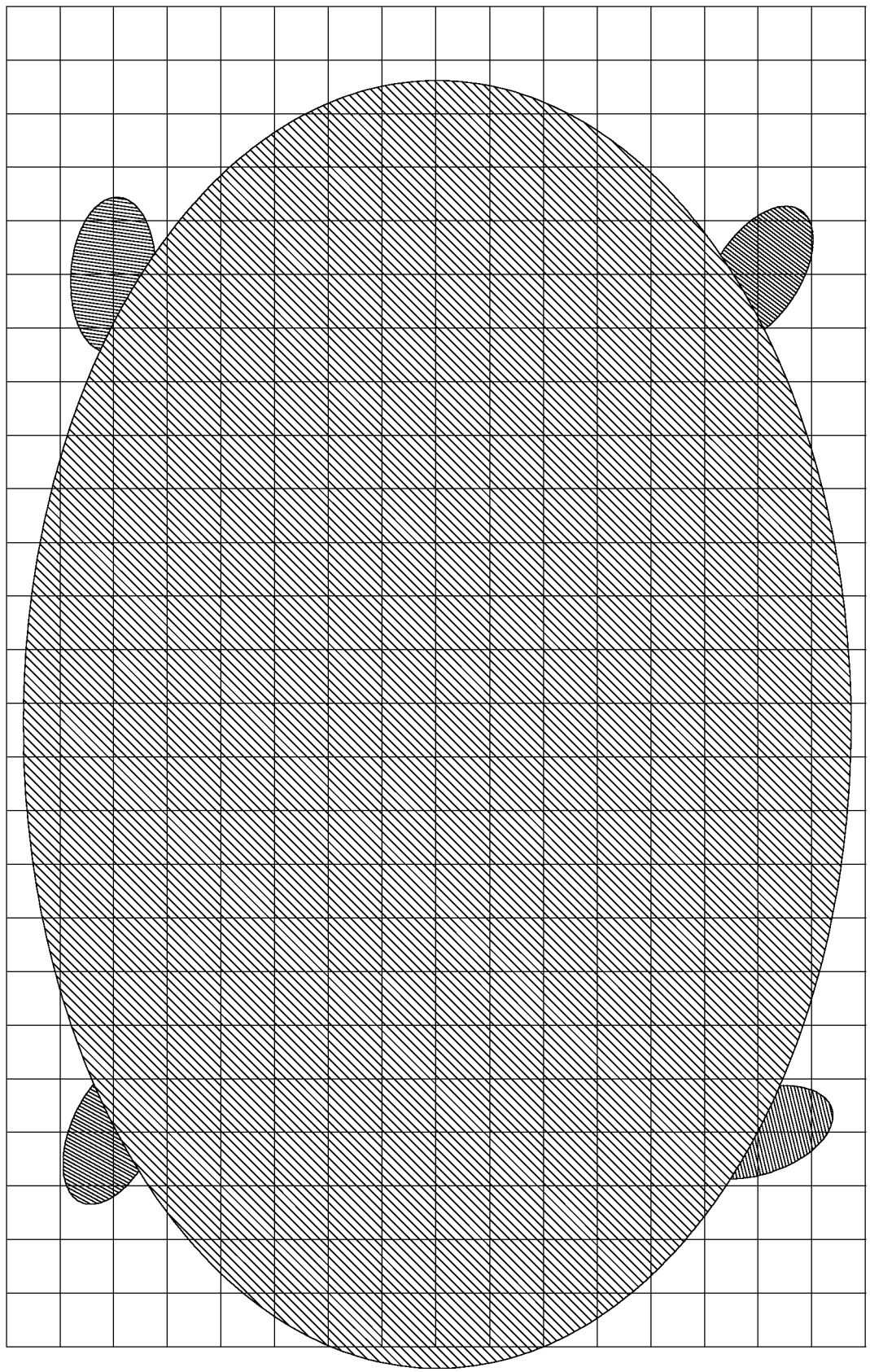
FIG. 4E is a simplified, not to scale, illustration of a scene as viewed by OFN circuitry in the embodiment of FIGS. 3A & 3B upon tampering by removing a key.

Reference is now made to FIG. 4E, which is a simplified illustration of a scene as viewed by OFN module 342 upon tampering by removing a key. In this example, where ambient light is present, removal of a key, such as the number 5 key, allows a flood of light into the housing, such that OFN module 342 seems an image which may be similar to what is shown in FIG. 4E.

Figure 5A:
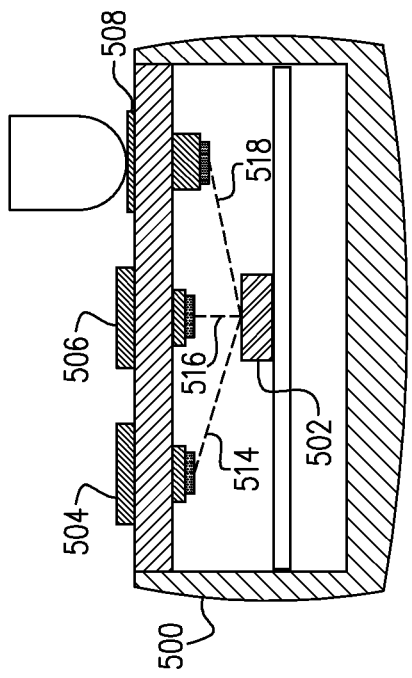
FIGS. 5A and 5B are simplified, not to scale, sectional illustrations showing detection of key displacement to at least a predetermined extent in a data entry device including OFN circuitry.
Figure 5B:
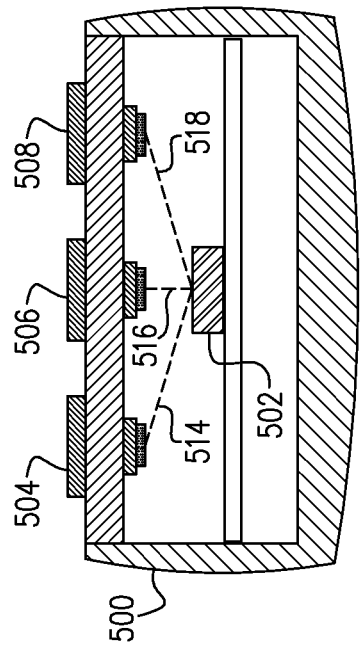

Reference is now made to FIGS. 5A and 5B, which are simplified, not to scale, sectional illustrations showing detection of a key displacement beyond a predetermined extent in a data entry device 500 including OFN circuitry, typically in the form of an OFN module 502, such as a Model 27903 commercially available from Parallax Inc. FIG. 5A shows three keys 504, 506 and 508, none of which is depressed and all of which are sensed by the OFN module 502, as indicated schematically by respective beam designations 514, 516 and 518. FIG. 5B shows key 508 being depressed and this key displacement beyond a predetermined extent being optically sensed by the OFN module 502.

Figure 6A:
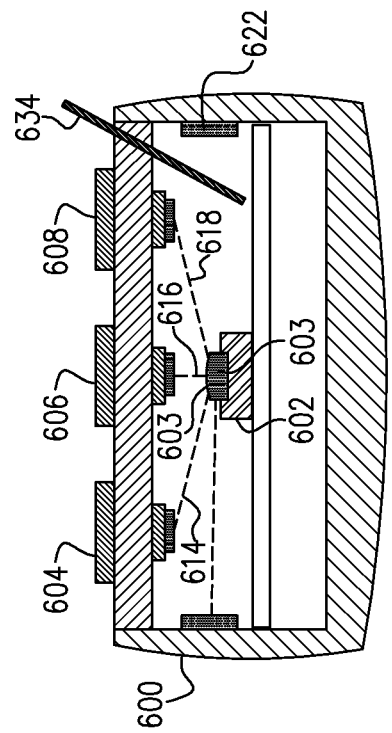
FIGS. 6A and 6B are simplified, not to scale, sectional illustrations showing detection of insertion of a probe in a data entry device including OFN circuitry.
Figure 6B:
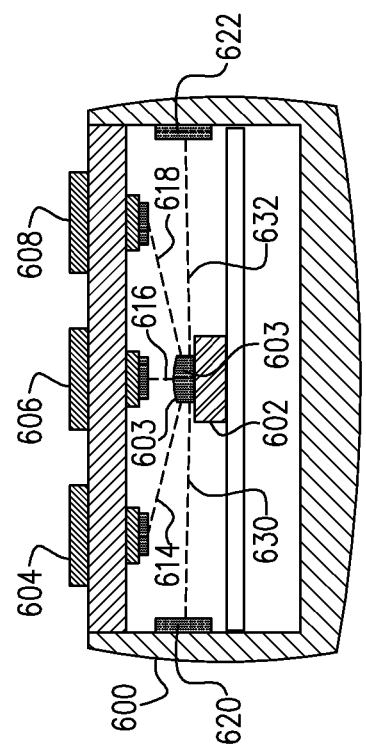

Reference is now made to FIGS. 6A and 6B, which are simplified, not to scale, sectional illustrations showing detection of insertion of a probe in a data entry device 600 including OFN circuitry, typically in the form of an OFN module 602, such as a Model 27903 commercially available from Parallax Inc., having a lens 603, which may be provided to widen the field of view of the OFN module 602. FIG. 6A shows three keys 604, 606 and 608, all of which are sensed by the OFN module 602, as indicated schematically by respective beam designations 614, 616 and 618. Here it is seen that additional features, such as interior housing mounted reflective surfaces 620 and 622, are also sensed by the OFN module 602, as indicated schematically by respective beam designations 630 and 632.

FIG. 6B shows that the insertion of a probe 634 blocks sensing of reflective surface 622, which, in accordance with a preferred embodiment of the present inventions, results in a tamper alarm indication.

Figure 7B:
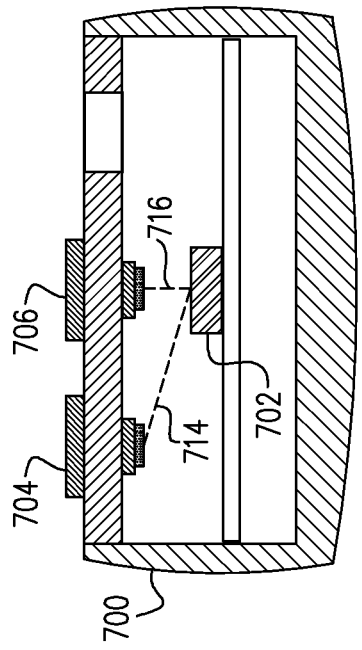
FIGS. 7A and 7B are simplified, not to scale, sectional illustrations showing detection of key removal in a data entry device including OFN circuitry.
Figure 7A:
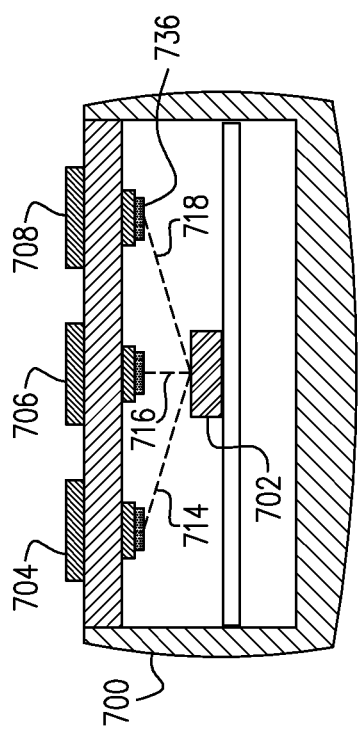

Reference is now made to FIGS. 7A and 7B, which are simplified, not to scale, sectional illustrations showing detection of a key displacement beyond a predetermined extent in a data entry device 700 including OFN circuitry, typically in the form of an OFN module 702, such as a Model 27903 commercially available from Parallax Inc. FIG. 7A shows three keys 704, 706 and 708, all of which are sensed by the OFN module 702, as indicated schematically by respective beam designations 714, 716 and 718. Keys 704, 706 and 708 preferably have readily optically identifiable markings similar to readily optically identifiable markings 136 (FIG. 1B) formed on corresponding bottom facing surfaces thereof, one of which is designated by reference number 736. FIG. 7B shows key 708 having been removed and this key removal being optically sensed by the OFN module 702, resulting in a tamper alarm indication.

Figure 8B:
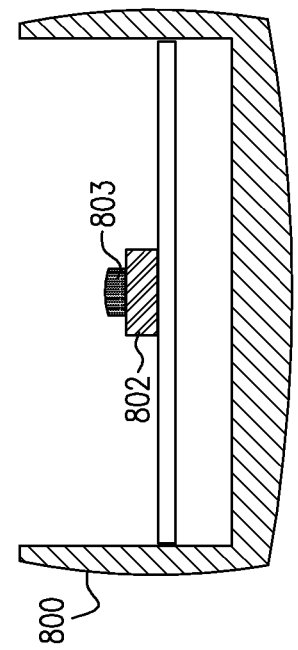
FIGS. 8A and 8B are, not to scale, simplified sectional illustrations showing detection of opening of a data entry device including OFN circuitry.
Figure 8A:
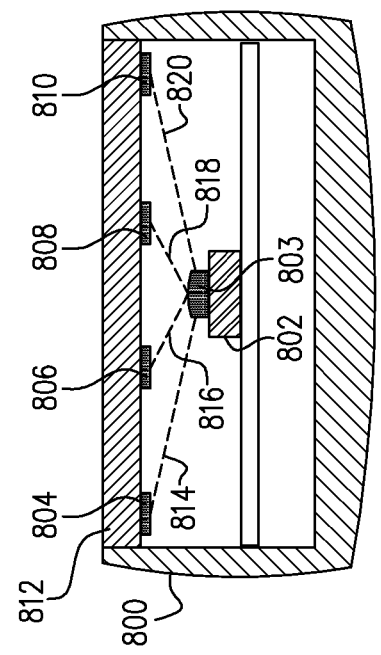

Reference is now made to FIGS. 8A and 8B, which are simplified, not to scale, sectional illustrations showing detection of opening of a data entry device 800 including OFN circuitry, typically in the form of an OFN module 802, such as a Model ADBS-A350 commercially available from Pixart No. 5, Innovation Road 1, HsinChu Science Park, Hsin-Chu, Taiwan, R.O.C. (HQ) having a lens 803, which may be provided to widen the field of view of the OFN module 802. FIG. 8A shows typically four reflecting panels 804, 806, 808 and 810 mounted onto an interior surface of a housing portion 812, all of which are sensed by the OFN module 802, as indicated schematically by respective beam designations 814, 816 and 818 and 820.

FIG. 8B shows that opening of the data entry device and removal of housing portion 812 eliminates sensing of the four reflecting panels 804, 806, 808 and 810 mounted onto an interior surface of a housing portion 812, as sensed by the OFN module 802, resulting in a tamper alarm indication.

Figure 9:
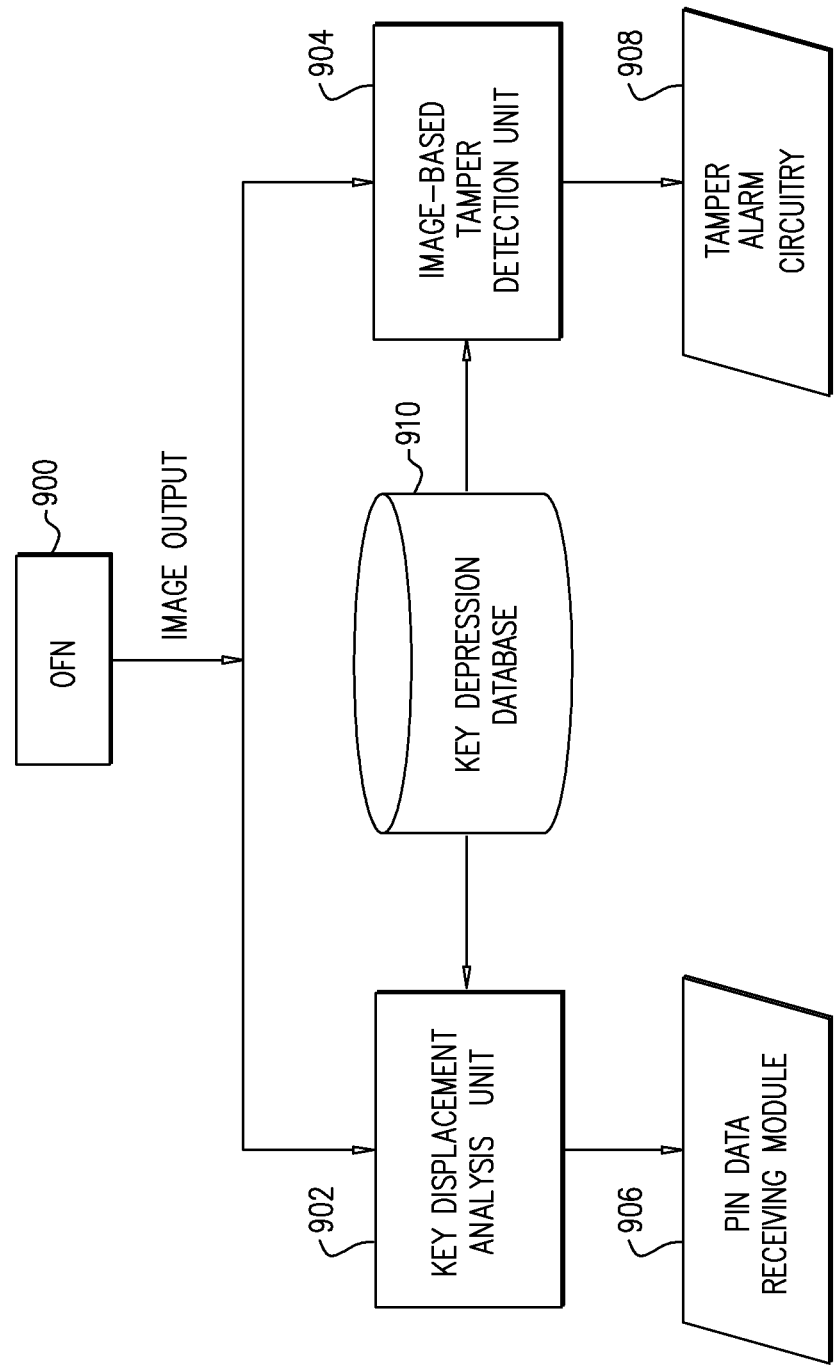
FIG. 9 is a simplified functional block diagram illustrating operation of the secure keypad device constructed and operative in accordance with a preferred embodiment of the present invention and including OFN circuitry operative for at least one of tamper detection and key displacement identification of FIGS. 1A-8B.

Reference is now made to FIG. 9, which is a simplified functional block diagram illustrating operation of the a secure keypad device constructed and operative in accordance with a preferred embodiment of the present invention and including OFN circuitry operative for at least one of tamper detection and key displacement beyond a predetermined extent identification of FIGS. 1A-8B.

As seen in FIG. 9, OFN circuitry 900, such as circuitry embodied in an OFN module of the type described hereinabove, provides an image output to at least two functional units, a key displacement analysis unit 902 and an image-based tamper detection unit 904. Preferably, the output of the OFN circuitry and or of the OFN module is encrypted by suitable encryption functionality.

In accordance with one embodiment of the invention, functional units 902 and 904 may be embodied in a microprocessor included on an OFN module, such as OFN module 142 (FIGS. 1A & 1B), OFN module 342 (FIGS. 3A & 3B), OFN module 502 (FIGS. 5A & 5B), OFN module 602 (FIGS. 6A & 6B), OFN module 702 (FIGS. 7A & 7B) or OFN module 802 (FIGS. 8A & 8B). Alternatively, units 902 and 904 may be separate from the OFN Module. For example, units 902 and 904 may be embodied in anti-tampering detection circuitry 160 (FIGS. 1A & 1B) or anti-tampering detection circuitry 360 (FIGS. 3A & 3B) or in main microprocessor 180 (FIGS. 1A & 1B) or main microprocessor 380 (FIGS. 3A & 3B).

The key displacement analysis unit 902 is preferably operable to ascertain which of a plurality of mechanical keys is mechanically depressed and to provide a corresponding output indication, preferably via a secure connection to a data receiver, such as a PIN data receiving module 906. The key displacement analysis unit 902 preferably employs optical information received from the OFN module including at least one of size, shape and intensity of reflected optical image elements.

The image-based tamper detection unit 904 is operative, for example, as described hereinabove with respect to one or more of the embodiments shown in FIGS. 1A-8B, to detect tampering with a data entry device. The image-based tamper detection unit, upon ascertaining the existence of a tamper situation, provides a tamper output to tamper alarm circuitry 908.

It is appreciated that both the key displacement analysis unit 902 and the image-based tamper detection unit 904 may receive stored information from an approved key-depression database 910, which stores data, such as image data or data derived therefrom, which corresponds to depressions of predetermined keys or combinations thereof.

The key displacement analysis unit 902 preferably employs the information stored in the database 910 for key displacement identification and the image-based tamper detection unit 904 preferably employs the information stored in the database 910 for eliminating false tamper alarms when actual key displacement to at least a predetermined extent is detected.

It is appreciated that the OFN circuitry in any of the OFN modules, such as OFN module 142 (FIGS. 1A & 1B), OFN module 342 (FIGS. 3A & 3B), OFN module 502 (FIGS. 5A & 5B), OFN module 602 (FIGS. 6A & 6B), OFN module 702 (FIGS. 7A & 7B) or OFN module 802 (FIGS. 8A & 8B) can provide various types of tamper detection functionality.

For the sake of conciseness, reference is made in the following discussion to one example, namely OFN module 142 (FIGS. 1A & 1B). It is appreciated that OFN module 142 will see optically identifiable markings 136 and 139 and will likely see many other things in its field of vision. Some of the other things seen by the OFN module 142, other than optically identifiable markings 136 and 139, may be considered as quiescent background noise, and may be very useful in detecting tampering. This background noise may be used as a thumbprint, captured upon manufacture of the device at the factory, employed for verification, typically each time that the device is booted up, that the device has not been tampered with.

Turning now to the example illustrated in FIGS. 6A & 6B, it is appreciated that in the event that a tool, such as probe 634, is employed in physical tampering with a data entry device equipped with an OFN module 602 in accordance with an embodiment of the present invention, preferably one, more than one, or all of the following events is sensed:

a. the tool that is inserted into the device is sensed by the OFN module as a foreign object, either by virtue of blocking a reflection from an identifiable marking, such as reflective surface 622, or by virtue of a reflection from the tool, which is not recognized as an identifiable marking;

b. a hole made in the device by such a tool is sensed by the OFN module as a change in the thumbprint; and c. upon removal of the tool in a lighted environment, light enters the device via the hole, thereby flooding the interior of the device with light, which light is sensed by the OFN module.

Turning now to the example illustrated in FIGS. 7A & 7B, it is appreciated that in the event that one or more keys, such as keys 704, 706 and 708, are removed from the data entry device equipped with an OFN module 702 in accordance with an embodiment of the present invention, preferably one, more than one, or all of the following events is sensed:

a. upon removal of the key, such as key 708, in a lighted environment, light enters the device via the hole remaining after removal of the key, thereby flooding the interior of the device with light, which light is sensed by the OFN module;

b. upon removal of the key, such as key 708, the absence of a readily optically identifiable marking, such as readily optically identifiable marking 736, formed on a bottom facing surface of the removed key is sensed by the OFN module;

c. removal of the key 708 produces a change in the thumbprint, which change is sensed by the OFN module.

Raw data outputted by an OFN module, such as OFN module 142 (FIGS. 1A & 1B), OFN module 342 (FIGS. 3A & 3B), OFN module 502 (FIGS. 5A & 5B), OFN module 602 (FIGS. 6A & 6B), OFN module 702 (FIGS. 7A & 7B) or OFN module 802 (FIGS. 8A & 8B) typically includes a data array of M bytes (N×N pixels), wherein the value of each byte may vary between 0 to K proportionally, or inversely proportionally, to the amount of light sensed by each given pixel.

The OFN module typically includes a small on-board microcontroller and memory. The OFN module can operate in two operational modes: a Raw Data Mode and a Configurable Mode.

When operating in the Raw Data Mode, the OFN module sends the data array to the on board microcontroller when requested by the on board microcontroller.

When operating in the Configurable Mode, the OFN module can be programmed at the factory to sense and store in memory various alarm scenarios and to generate an alarm signal upon the occurrence of one of the pre-configured alarm scenarios. Alternatively, the OFN module can be configured to generate an alarm signal when the scene viewed by the OFN module does match a thumbprint stored in memory. Additionally, the OFN module can be configured to provide different alarm signals depending on the occurrence of different tampering scenarios as sensed by the OFN module.

Preferably, the encryption functionality of the OFN circuitry 900 vis a vis the main microprocessor 180 (FIGS. 1A & 1B) or main microprocessor 380 (FIGS. 3A & 3B) or the corresponding main microprocessor of any of the secure keypads or data entry devices of FIGS. 5A-8B includes the following functional features, described hereinbelow with respect to FIGS. 1A & 1B as an example:

Preferably, at the factory, the main microprocessor 180 becomes aware that there is no encryption key for its OFN module 142.

The main microprocessor 180 generates an encryption key, which is typically a symmetric encryption key, and transmits it to the OFN module 142 as clear text. From then on, all communication between the main microprocessor 180 and the OFN module 142 is encrypted.

Upon occurrence of sensed tampering, the alarm detection circuitry 160 will cause the main microprocessor 180 to erase the encryption key and any other sensitive information and thus prevent further communication and PIN entry from taking place.

Considering the overall operation of the devices described hereinabove, it is appreciated that the OFN module of each device, as appropriate, can be configured, inter alia, to carry out any one or more of the following functions:

Report a valid key displacement to at least a predetermined extent;

Report a combination of key displacements to at least a predetermined extent;

Not report when all or most of the keys are pressed;

Report that a foreign object is present within the housing of the device;

Report that a key has been removed;

Report that the OFN "thumbprint" of the device has changed beyond a predetermined threshold;

Remain in a sleep mode, as a default, to conserve energy, thereby prolonging battery life;

Exit from sleep mode, without being prompted by the main microprocessor, to read its current thumbprint;

If the thumbprint matches a stored thumbprint, return to sleep mode;

If the current thumbprint does not match the stored thumbprint, send an alarm signal to the main microprocessor;

Respond to a request from the main microprocessor to verify the current thumbprint before allowing PIN entry; and Accept an encryption key to facilitate encrypted communication between the OFN module and the main microprocessor.

When the OFN module is not in the sleep mode, the OFN module preferably verifies its current thumbprint every second and alerts the main microprocessor if the current thumbprint differs from stored thumbprint beyond a threshold amount. If requested by the main microprocessor, the OFN module verifies its current thumbprint as a condition to allowing PIN entry. When PIN entry is allowed, key displacement to at least a predetermined extent is reported by the OFN module to the main microprocessor.

During times of inactivity, the main microprocessor periodically requests the status of the OFN module.

When the device is in a sleep mode, the OFN module goes into deep sleep mode, and wakes up every second to validate its current thumbprint. If the current thumbprint matches the stored thumbprint, the OFN module returns to the sleep mode. If the current thumbprint does not match the stored thumbprint, the OFN module records this state in a non-volatile memory, wakes up the main microprocessor and reports the not matching current thumbprint to the main microprocessor when the main microprocessor periodically requests the current status.

It is appreciated that the system can be configured so that the OFN module determines that a tamper condition has occurred, or can be configured it only report raw data, in which configuration the main microprocessor makes all determinations of tamper conditions based, inter alia, on the raw data received from the OFN module. Additionally, any suitable combination of configurations of the OFN module and the main microprocessor is also possible.

Preferably, the OFN module will also determine which PIN keys are pressed and report PIN keys to the main microprocessor.

Alternatively the OFN module sends raw data to the main microprocessor, which determines whether a tamper condition exists or not.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

The invention claimed is:

1. A device, comprising: a device housing defining an enclosed space; a light source disposed in the device housing operative to illuminate the enclosed space; an optical sensor disposed in the device housing and operative to generate first and second outputs based on different optical conditions from within the device housing when the light source illuminates the enclosed space; the first output corresponds to quiescent background noise when the device is in a known untampered state; anti-tampering detection circuitry operative to detect a tampering event based on the first and second outputs from the optical sensor; and wherein a first optical condition of the different optical conditions is based on light reflected from an optically identifiable marking within the device housing, and wherein a second optical condition of the different optical conditions sensed by the optical sensor is based on light reflected from the optically identifiable marking within the device housing.

2. The device of claim 1, wherein the second optical condition of the different optical conditions sensed by the optical sensor is based on light reflected from a location within the device housing.

3. The device of claim 1, wherein the first output is generated during boot up of the device; and the anti-tampering detection circuitry is further operative to compare the first output against the second output after boot up of the device.

4. The device of claim 1, wherein the tampering event is detected based on a detected change between the first and second outputs, wherein the second output has changed beyond a predetermined threshold amount.

5. The device of claim 1, wherein the different optical conditions comprise an image.

6. The device of claim 1, wherein the first or second output generated by the optical sensor is encrypted.

7. A data entry device, comprising: a device housing defining an enclosed space; a light source disposed within the device housing and operative to illuminate the enclosed space; an optical sensor operative to generate first and second outputs based on different optical conditions received from a plurality of locations within the enclosed space when the light source illuminates the enclosed space; an image-based tamper detection unit operative to compare the first and second outputs to detect a tampering event; wherein the first output corresponds to quiescent background noise when the device is in a known untampered state; and wherein a first optical condition of the different optical conditions is based on light reflected from an optically identifiable marking within the device housing, and wherein a second optical condition of the different optical conditions sensed by the optical sensor is based on light reflected from the optically identifiable marking within the device housing.

8. The data entry device of claim 7, wherein the optical sensor is operative to sense the optically identifiable marking within the device housing.

9. The data entry device of claim 7, wherein the different optical conditions are based on light reflected from a location within the device housing.

10. The data entry device of claim 7, wherein the tampering event is based on determining that the second output has changed beyond a predetermined threshold amount.

11. The data entry device of claim 7, wherein the first output of the different optical conditions is generated during boot up of the device; and the image-based tamper detection unit is further operative to detect the tampering event by comparing the second output against the first output after boot up of the device.

12. The data entry device of claim 7, wherein the first or second output generated by the optical sensor is encrypted.

13. A method of detecting a tampering event in a device, comprising:
- illuminating an enclosed space defined by a device housing with a light source disposed in the device housing;
- generating, with an optical sensor disposed in the device housing, first and second outputs based on different optical conditions from within the device housing when the light source illuminates the enclosed space, wherein the first output corresponds to quiescent background noise when the device is in a known untampered state; and
- detecting, with anti-tampering detection circuitry, the tampering event based on the first and second outputs from the optical sensor;
- wherein a first optical condition of the different optical conditions is based on light reflected from an optically identifiable marking within the device housing; and
- wherein a second optical condition of the different optical conditions sensed by the optical sensor is based on light reflected from the optically identifiable marking within the device housing.

14. The method of claim 13, wherein the second optical condition of the different optical conditions sensed by the optical sensor is based on light reflected from a location within the device housing.

15. The method of claim 13, wherein the first output is generated during boot up of the device; and the method further comprises comparing, with the anti-tampering detection circuitry, the first output against the second output after boot up of the device.

16. The method of claim 13, wherein detecting the tampering event is based on a detected change between the first and second outputs, wherein the second output has changed beyond a predetermined threshold amount.

17. The method of claim 13, wherein the different optical conditions comprise an image.

18. The method of claim 13, wherein the first or second output generated by the optical sensor is encrypted.

* * * * *